US011262894B2

(12) United States Patent
Sugihara et al.

(10) Patent No.: US 11,262,894 B2
(45) Date of Patent: Mar. 1, 2022

(54) INFORMATION PROCESSING DEVICE AND INFORMATION PROCESSING METHOD

(71) Applicant: SONY CORPORATION, Tokyo (JP)

(72) Inventors: Kenji Sugihara, Kanagawa (JP); Tomohisa Tanaka, Tokyo (JP); Tsubasa Tsukahara, Tokyo (JP); Ryo Fukazawa, Kanagawa (JP); Akane Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 16/323,124

(22) PCT Filed: May 22, 2017

(86) PCT No.: PCT/JP2017/019051
§ 371 (c)(1),
(2) Date: Feb. 4, 2019

(87) PCT Pub. No.: WO2018/037645
PCT Pub. Date: Mar. 1, 2018

(65) Prior Publication Data
US 2019/0171350 A1 Jun. 6, 2019

(30) Foreign Application Priority Data
Aug. 24, 2016 (JP) .............................. JP2016-163490

(51) Int. Cl.
G06F 3/0484 (2013.01)
G06F 3/04842 (2022.01)
G06T 19/00 (2011.01)
G06F 3/01 (2006.01)
A63F 13/00 (2014.01)
G06F 3/0487 (2013.01)

(52) U.S. Cl.
CPC .......... G06F 3/04842 (2013.01); A63F 13/00 (2013.01); G06F 3/011 (2013.01); G06F 3/0484 (2013.01); G06F 3/0487 (2013.01); G06T 19/00 (2013.01)

(58) Field of Classification Search
CPC .......................... G06F 3/04842; G06F 3/0487
See application file for complete search history.

(56) References Cited

U.S. PATENT DOCUMENTS

| 2013/0311079 | A1* | 11/2013 | Rakshit | G01C 21/3623 701/400 |
| 2017/0228922 | A1* | 8/2017 | Kaeser | A63F 13/5255 |
| 2017/0372649 | A1* | 12/2017 | Itoh | G09G 3/002 |
| 2018/0061134 | A1* | 3/2018 | Ota | B60K 35/00 |

FOREIGN PATENT DOCUMENTS

JP 2013-061870 A 4/2013

OTHER PUBLICATIONS

International Search Report and Written Opinion of PCT Application No. PCT/JP2017/019051, dated Jul. 4, 2017, 10 pages of ISRWO.

* cited by examiner

Primary Examiner — Anil K Bhargava
(74) Attorney, Agent, or Firm — Chip Law Group

(57) ABSTRACT

Provided is an information processing device including a processing unit that performs decision determination with respect to an option associated with a predetermined object by determining whether a user is following the predetermined object.

18 Claims, 7 Drawing Sheets

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/019051 filed on May 22, 2017, which claims priority benefit of Japanese Patent Application No. JP 2016-163490 filed in the Japan Patent Office on Aug. 24, 2016. Each of the above-referenced applications is hereby incorporated herein by reference in its entirety.

TECHNICAL FIELD

The present disclosure relates to an information processing device, an information processing method, and a program.

BACKGROUND ART

Techniques enabling operation of an operation target device according to an operation to be performed on an operation image displayed on a display screen have been developed. An example of the above-described techniques is a technique disclosed in the following Patent Literature 1.

CITATION LIST

Patent Literature

Patent Literature 1: JP 2011-209965A

DISCLOSURE OF INVENTION

Technical Problem

It is desirable to realize a natural user interface (NUI) which is a user interface allowing a user (person) to perform an operation with a more natural and intuitive motion as a user interface according to operation of a device.

The present disclosure proposes a new and improved information processing device, information processing method, and program which are capable of realizing decision of an option based on a user's motion.

Solution to Problem

According to the present disclosure, there is provided an information processing device including a processing unit that performs decision determination with respect to an option associated with a predetermined object by determining whether a user is following the predetermined object.

In addition, according to the present disclosure, there is provided an information processing method executed by an information processing device, the information processing method including a step of performing decision determination with respect to an option associated with a predetermined object by determining whether a user is following the predetermined object.

In addition, according to the present disclosure, there is provided a program causing a computer to achieve a function of performing decision determination with respect to an option associated with a predetermined object by determining whether a user is following the predetermined object.

Advantageous Effects of Invention

According to the present disclosure, it is possible to realize decision of an option based on a user's motion.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1A:
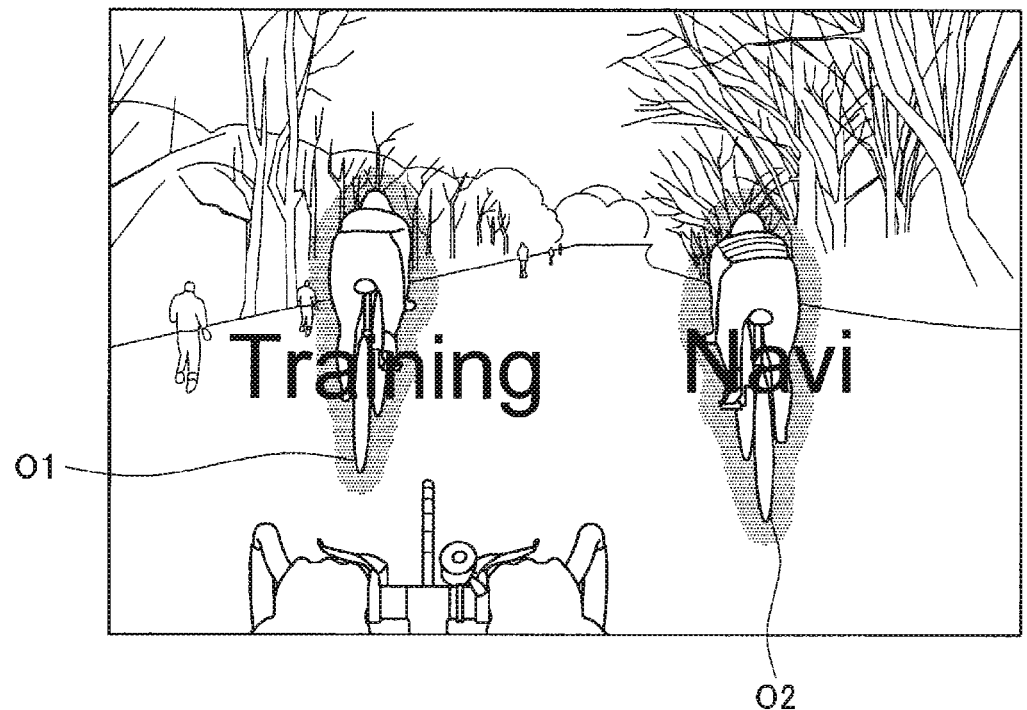
FIGS. 1A and 1B are diagrams illustrating an example of a user interface realized by an information processing method according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter, a description will be given in the following order.
1. Information processing method according to the present embodiment
2. Information processing device according to the present embodiment
3. Program according to the present embodiment

Information Processing Method According to the Present Embodiment

First, an information processing method according to the present embodiment will be described. Hereinafter, a case in which an information processing device according to the present embodiment performs a process according to the information processing method according to the present embodiment will be described as an example.

[1] Outline of Information Processing Method According to the Present Embodiment The information processing method according to the present embodiment realizes decision of an option not by an existing user interface such as a graphical user interface (GUI) through the display of a menu but by a hands-on NUI.

More specifically, in a user interface according to the information processing method according to the present embodiment, an option associated with a predetermined object is decided on the basis of a user following the predetermined object.

Figure 1B:
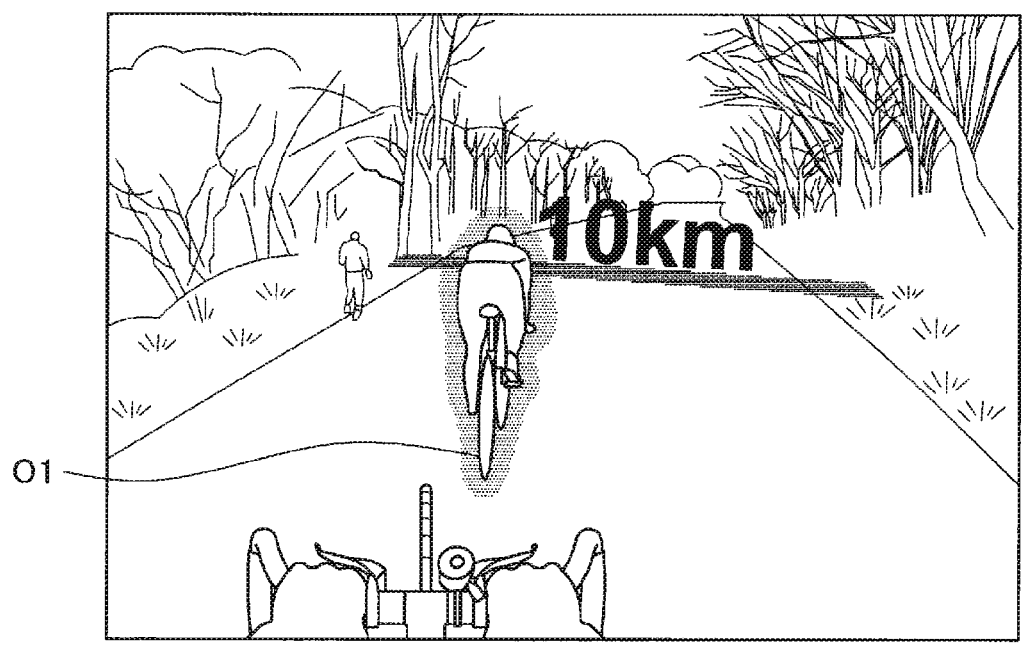

FIGS. 1A and 1B are diagrams illustrating an example of a user interface realized by the information processing method according to the present embodiment. P FIGS. 1A and 1B illustrate an example of a user interface in which a user can select an object O1 associated with training (an example of an option) and an object O2 associated with navigation (an example of an option) while riding a bicycle.

Note that, although FIGS. 1A and 1B illustrate an example in which there are two options, the number of options in a user interface according to the present embodiment is not limited to the example illustrated in FIGS. 1A and 1B. For example, the number of options in the user interface according to the present embodiment may be one or may be three or more. In addition, as will be described later, the number of options in the user interface according to the present embodiment may be controlled through a process according to the information processing method according to the present embodiment.

In addition, FIGS. 1A and 1B illustrate an example of display on a display screen of a head mounted display when a user wears the head mounted display on his or her head. Hereinafter, a head mounted display will be referred to as an "HMD". Here, an HMD worn by a user may be a transmission type device or may be a non-transmission type device. A transmission type HMD includes, for example, a half mirror and is configured to display a virtual object superimposed on the outside scenery visually perceived through a half mirror. Such a transmission type HMD may be referred to as an optical transmission type HMD. Note that, in addition to a half mirror method, any display method capable of realizing a transmission type, such as a hologram method or a pupil division method, may be adopted as a display method for realizing a transmission type. In addition, for example, the non-transmission type HMD is configured to electronically show the outside scenery by displaying an image of the outside scenery which is captured by an imaging device on a display screen. Such a non-transmission type HMD may be referred to as a video transmission type HMD. A display mode using an optical transmission type HMD or a video transmission type HMD is generally known as augmented reality (AR) or mixed reality (MR). For example, the non-transmission type HMD may be configured to display an image of a virtual space on a display screen instead of an image of the real space. A display mode of such a non-transmission type HMD is generally known as virtual reality (VR).

Note that, as will be described later, an information processing device according to the present embodiment may be applied to an HMD. In a case in which the information processing device according to the present embodiment is applied to an HMD, it is assumed that the information processing device is mainly applied to an optical transmission type HMD, but the information processing device according to the present embodiment may also be applied to a video transmission type HMD or a non-transmission type HMD of a VR mode.

Here, each of the object O1 and the object O2 illustrated in FIGS. 1A and 1B is an example of a predetermined object associated with an option. The predetermined object according to the present embodiment may be, for example, a virtual object or may be a real object which is present in the real space. FIGS. 1A and 1B illustrate an example in which the object O1 and the object O2 are virtual objects.

For example, a process according to presentation of a predetermined object, such as display of a virtual object or display of a virtual object (corresponding to "Training", "Navi", and the like when taking FIGS. 1A and 1B as an example) according to a description of an option to be added to a real object may be performed by the information processing device according to the present embodiment or may be performed by an external device of the information processing device according to the present embodiment.

FIG. 1A illustrates an example of display on a display screen before an option is decided. In addition, FIG. 1B illustrates an example of display on a display screen after an option is decided, and illustrates an example of a display screen displayed after training which is an option associated with the object O1 is decided.

Before an option is decided, the object O1 and the object O2 (examples of a predetermined object) associated with a selectable option are displayed, as illustrated in FIG. 1A.

For example, when a user operates a bicycle to approach the object O1, training which is an option associated with the object O1 is decided. The above-described example is realized by, for example, the information processing device according to the present embodiment determining that the user is following the object O1 on the basis of the fact that the user approaches the object O1. An example of a process of determining whether a user is following a predetermined object in the information processing device according to the present embodiment will be described later.

When an option is decided, a process corresponding to the decided training is performed, and for example, display as illustrated in FIG. 1B is performed on the display screen.

For example, as illustrated in FIGS. 1A and 1B, a user interface capable of deciding an option by a hands-on NUI in which an option is decided by a user following a predetermined object according to the information processing method according to the present embodiment is realized.

[2] Process According to Information Processing Method According to the Present Embodiment Hereinafter, a process according to the information processing method according to the present embodiment which is capable of realizing decision of an option using the above-described hands-on NUI will be described.

In addition, hereinafter, a case in which a user wearing an HMD on his or her head decides an option while riding a bicycle will be mainly described as an example as in the example illustrated in FIGS. 1A and 1B. Further, in an example to be described below, the information processing device according to the present embodiment may be, for example, an HMD worn by a user or may be an external device (for example, a communication device such as a smart phone, a computer such as a server, or the like) of the HMD. An application example of the information processing device according to the present embodiment will be described later.

(1) Decision Process

The information processing device according to the present embodiment performs decision determination on an option associated with a predetermined object by determining whether or not a user is following the predetermined object. The information processing device according to the present embodiment performs decision determination, for example, in a case in which a relative positional relationship between at least a portion of the user and the predetermined object changes. The relative positional relationship is represented by, for example, a relative distance to be described later.

Here, the predetermined object according to the present embodiment is, for example, a virtual object associated with an option or a real object associated with an option. Hereinafter, a virtual object and a real object may be collectively referred to as "objects". In a case in which a predetermined object is a virtual object (virtual object) disposed in a virtual space, the information processing device according to the present embodiment determines that a user is following the virtual object in a case in which a virtual positional relationship between the user in the real space and the virtual object in the virtual space changes.

In addition, the predetermined object according to the present embodiment is, for example, an object satisfying a predetermined condition among objects associated with an option.

The predetermined condition is, for example, "a user is running behind an object associated with an option". Note that the predetermined condition according to the present embodiment is not limited to the above-described example. For example, the predetermined condition may be "a user is running behind an object associated with an option" or "a user is following the same route as an object associated with an option (a moving direction of the user is the same as a direction along the route)".

An option and a predetermined object are associated with each other using, for example, a table (or a database). The information processing device according to the present embodiment specifies an option associated with a predetermined object by referring to "a table (or a database) in which an option and a predetermined object are associated with each other" which is stored in a recording medium.

Note that a method of associating an option and a predetermined object with each other is not limited to the above-described example. The information processing device according to the present embodiment can specify an option associated with a predetermined object by, for example, any method which is capable of associating an option and a predetermined object with each other.

The information processing device according to the present embodiment determines that an option associated with a predetermined object has been decided in a case in which it is determined that a user is following the predetermined object. In addition, the information processing device according to the present embodiment determines that an option associated with a predetermined object has not been decided in a case in which it is not determined that a user is following the predetermined object.

That is, the information processing device according to the present embodiment performs decision determination on an option associated with a predetermined object on the basis of a result of determination regarding whether a user is following the predetermined object.

The information processing device according to the present embodiment determines whether or not a user is following a predetermined object, for example, by reflecting information regarding a real space on a virtual space to perform processing within the virtual space.

Here, for example, in a case in which a display mode for a non-transmission type HMD is virtual reality, a space corresponding to the position of a user is regarded as a space recognized by analyzing a captured image acquired from, for example, an imaging device (or an external imaging device of an HMD) which is included in the HMD worn by the user. In addition, the space corresponding to the position of the user may be regarded as a space recognized by analyzing a captured image acquired from an imaging device provided in a place corresponding to the position of the user. Further, a method of recognizing the space corresponding to the position of the user may be a combination of different methods.

In addition, for example, in a case in which a display mode of a non-transmission type HMD is virtual reality, for example, the movement of a user in virtual reality is recognized by a system according to virtual reality not as movement in a real space actually recognized by the user but as virtual movement in a space defined in advance. That is, in a case in which a display mode of the non-transmission type HMD is virtual reality, the position of a user in a virtual space is recognized by a system according to virtual reality not as an absolute position but as a virtual position calculated from virtual movement within the virtual space. For example, head tracking may be used for the estimation of the position of a user in a case in which a display mode of the non-transmission type HMD is virtual reality.

Information regarding a real space according to the present embodiment is, for example, information regarding a user such as one or two or more of "data indicating the position of the user", "data regarding movement of the user such as a moving speed, acceleration, and the like of the user", and "data regarding the visual line of the user such as data indicating a visual line vector of the user or the position of a visual line in which the visual line of the user is mapped from a point on a display screen".

The data indicating the position of the user is acquired from a position sensor such as a global navigation satellite system (GNSS) device (or an external GNSS device of an HMD, the same applies hereinafter) which is included in the HMD worn by the user. In addition, the data indicating the position of the user may be obtained by a process according to any method that can be used to estimate a position, such as a method using the intensity of a signal. In addition, the data regarding movement of the user is obtained on the basis of, for example, the data indicating positions of the user which correspond to a plurality of points in time. The data regarding the visual line of the user is obtained by a process according to any method that can be used to estimate the visual line of the user, such as a method using a corneal reflection method (pupil corneal reflection method).

The above-described process according to the acquisition of information regarding the user may be performed by the information processing device according to the present embodiment or may be performed by an external device of the information processing device according to the present embodiment.

Further, in a case in which a predetermined object is a real object, the information regarding a real space according to the present embodiment may include information regarding a real object such as "data indicating the position of the real object" and "data regarding movement of the real object such as a moving speed of the real object". The process according to the acquisition of information regarding the real object may be performed by the information processing device according to the present embodiment or may be performed by an external device of the information processing device according to the present embodiment, similar to a process according to the acquisition of information regarding a user.

The information processing device according to the present embodiment performs, for example, either one or both of a decision process according to a first example of (1-1) to be described below and a decision process according to a second example of (1-2) to be described below.

(1-1) First Example of Decision Process

The information processing device according to the present embodiment determines that a user is following a predetermined object, for example, in a case in which a relative distance between the user and the predetermined object (which may be simply referred to hereinafter as a "relative distance") satisfies a first condition and the user moves a predetermined distance. In addition, the information processing device according to the present embodiment determines that the user is not following the predetermined object, for example, in a case in which the relative distance does not satisfy the first condition or the user does not move the predetermined distance even when the relative distance satisfies the first condition.

Here, the relative distance according to the present embodiment is, for example, a Euclidean distance between the position of the user in a virtual space and the position of the predetermined object in the virtual space.

Note that the relative distance is not limited to the Euclidean distance. For example, the relative distance may be represented by a value of a counter.

In addition, the relative distance is not limited to a linear distance connecting the user and the predetermined object to each other, and may be a distance which is nonlinearly connected in accordance with a peripheral situation of the user. In addition, a position offset from each of the actual positions may be regarded as a starting point or an ending point of the relative distance. In addition, the relative distance may be measured or estimated by any method such as a method based on a detection result of a position sensor such as any of various distance sensors or a GNSS device. For example, in a case in which the user is in a car, the positions of the user and the predetermined object may be estimated on the basis of inter-vehicle communication or road-vehicle communication. Here, the inter-vehicle communication may be regarded as communication for obtaining information (a position, a speed, vehicle control information, and the like) regarding a peripheral vehicle by wireless communication between vehicles. By adopting the inter-vehicle communication, it is also possible to recognize the position of a preceding vehicle which is in the shade and cannot be visually perceived by the user.

As described above, the information processing device according to the present embodiment determines whether or not the user is following the predetermined object by performing a first determination process for determining whether or not the relative distance satisfies the first condition and a second determination process for determining whether or not the user moves a predetermined distance when the first condition is satisfied.

Hereinafter, the first determination process and the second determination process according to a process of determining whether or not the user is following the predetermined object will be described more specifically.

(I) First Determination Process

The information processing device according to the present embodiment determines whether or not the relative distance satisfies the first condition. The information processing device according to the present embodiment repeatedly performs the first determination process, for example, on a regular or irregular basis.

More specifically, the information processing device according to the present embodiment determines whether or not the first condition is satisfied by comparing the relative distance and a set first threshold value with each other.

The first threshold value according to the present embodiment may be a fixed value which is set in advance, or may be a variable value that is changeable on the basis of the user's operation or the like. The information processing device according to the present embodiment specifies the first threshold value by reading out data indicating the first threshold value from the recording medium such as a storage unit (to be described later).

The information processing device according to the present embodiment determines that the first condition is satisfied, for example, in a case in which the relative distance is equal to or less than the first threshold value (or a case in which the relative distance is smaller than the first threshold value). In addition, the information processing device according to the present embodiment determines that the first condition is not satisfied, for example, in a case in which the relative distance is larger than the first threshold value (or a case in which the relative distance is equal to or less than the first threshold value). That is, the first condition depends on, for example, the first threshold value.

(II) Second Determination Process

The information processing device according to the present embodiment determines whether or not the user has moved the predetermined distance when it is determined that the first condition is satisfied through the first determination process.

The information processing device according to the present embodiment determines whether or not the user has moved the predetermined distance, for example, by comparing a moving distance of the user in a state where the first condition is satisfied and a set second threshold value with each other.

Here, the moving distance of the user in a state where the first condition is satisfied is, for example, a Euclidean distance between "the position of the user in a virtual space at a certain point in time when it is determined that the first condition is satisfied" and "the position of the user in the virtual space at another point in time when it is determined that the first condition is satisfied". In addition, the moving distance of the user in a state where the first condition is satisfied may be represented by a value of a counter.

The second threshold value according to the present embodiment may be a fixed value which is set in advance, or may be a variable value that is changeable on the basis of the user's operation or the like. The information processing device according to the present embodiment specifies the second threshold value by reading out data indicating the second threshold value from the recording medium such as a storage unit (to be described later).

The information processing device according to the present embodiment determines that the user has moved the predetermined distance, for example, in a case in which the moving distance of the user in a state where the first condition is satisfied is equal to or larger than the second threshold value (or a case in which the moving distance is larger than the second threshold value). In addition, the information processing device according to the present embodiment determines that the user has not moved the predetermined distance, for example, in a case in which the moving distance of the user in a state where the first condition is satisfied is smaller than the second threshold value (or a case in which the moving distance is equal to or less than the second threshold value).

The information processing device according to the present embodiment determines whether or not the user is following the predetermined object, for example, by performing the first determination process and the second determination process as a process of determining whether or not the user is following the predetermined object.

In addition, as described above, the information processing device according to the present embodiment performs decision determination on an option associated with a predetermined object on the basis of a result of determination regarding whether a user is following the predetermined object.

Therefore, the information processing device according to the present embodiment can realize "the decision of an option based on a motion of the user who is following the predetermined object" by performing a decision process according to the first example as a process according to the information processing method according to the present embodiment.

(1-2) Second Example of Decision Process

The information processing device according to the present embodiment determines that the user is following the predetermined object, for example, in a state where the relative distance satisfies the first condition and a case in which a predetermined time has elapsed after a state where the relative distance satisfies the first condition is determined.

The information processing device according to the present embodiment determines whether being a state where the relative distance satisfies the first condition by performing the first determination process.

In addition, the information processing device according to the present embodiment determines whether or not the user is following the predetermined object by further performing a third determination process for determining whether or not a predetermined time has elapsed after a state where the relative distance satisfies the first condition to be described below is determined.

(III) Third Determination Process

The information processing device according to the present embodiment determines whether or not a predetermined time has elapsed after determining a state where the first condition is satisfied through the first determination process.

The information processing device according to the present embodiment determines whether or not a predetermined time has elapsed, for example, by comparing an elapsed time (represented, for example, in seconds) after a state where the first condition is satisfied is determined and a set third threshold value with each other. Note that the elapsed time after a state where the first condition is satisfied is determined may be represented by a value of a counter.

The third threshold value according to the present embodiment may be a fixed value which is set in advance, or may be a variable value that is changeable on the basis of the user's operation or the like. The information processing device according to the present embodiment specifies the third threshold value by reading out data indicating the third threshold value from the recording medium such as a storage unit (to be described later).

The information processing device according to the present embodiment determines that a predetermined time has elapsed, for example, in a case in which the elapsed time after a state where the first condition is satisfied is determined is equal to or larger than the third threshold value (or a case in which the time is larger than the third threshold value). In addition, the information processing device according to the present embodiment determines that the predetermined time has not elapsed, for example, in a case in which the elapsed time after a state where the first condition is satisfied is determined is smaller than the third threshold value (or a case in which the time is equal to or less than the third threshold value).

The information processing device according to the present embodiment determines whether or not the user is following the predetermined object, for example, by performing the first determination process and the third determination process as a process of determining whether or not the user is following the predetermined object.

In addition, as described above, the information processing device according to the present embodiment performs decision determination on an option associated with a predetermined object on the basis of a result of determination regarding whether a user is following the predetermined object.

Therefore, the information processing device according to the present embodiment can realize "the decision of an option based on a motion of the user who is following the predetermined object" by performing a decision process according to the second example as a process according to the information processing method according to the present embodiment.

As the decision process, the information processing device according to the present embodiment performs, for example, either one or both of the above-described decision process according to the first example of (1-1) and the above-described decision process according to the second example of (1-2).

As described above, a decision process is performed as a process according to the information processing method according to the present embodiment, so that "the decision of an option based on a motion of the user who is following the predetermined object" is realized.

In addition, the decision process is performed as a process according to the information processing method according to the present embodiment, so that the user can decide an option while moving such as decision of an option while riding a bicycle as in the example illustrated in FIGS. 1A and 1B. Therefore, according to the example illustrated in FIGS. 1A and 1B, for example, the following effects are exhibited by performing the decision process. Note that it is needless to say that the effects exhibited by performing the decision process are not limited to the following example.

As in a case in which an option is decided by an existing user interface such as a GUI, a user can concentrate on an experience of riding a bicycle (or cycling) without being restricted by an operation. In addition, the user can enjoy the experience of riding the bicycle (or cycling).

Since an option is decided by the movement of a user, it is possible to provide a more flexible service to the user. In addition, since an option is decided by the movement of the user, it is possible to more easily reflect the user's intention changeable depending on situations.

Note that the process according to the information processing method according to the present embodiment is not limited to the process (decision process) of (1) described above.

For example, the information processing device according to the present embodiment can further performs one or two or more of (2) a selection process, (3) a presentation control process, and (4) an execution control process to be described below as the processes according to the information processing method according to the present embodiment.

(2) Selection Process

The information processing device according to the present embodiment determines whether or not a user is selecting a predetermined object.

In a case in which the selection process is further performed, the information processing device according to the present embodiment determines whether or not the user is following the predetermined object, which is determined to be selected in the selection process, in the process (decision process) of (1) described above.

The information processing device according to the present embodiment performs, for example, any one process of a selection process according to a first example of (2-1) to be described below to a selection process according to a sixth example of (2-6) to be described below as a selection process.

(2-1) First Example of Selection Process

The information processing device according to the present embodiment determines whether or not the user is selecting the predetermined object by determining whether or not the relative distance satisfies the second condition.

The information processing device according to the present embodiment determines whether or not the relative distance satisfies the second condition, for example, by performing the same process as the first determination process in the process (decision process) of (1) described above. The second condition depends on, for example, a threshold value according to the determination of the second condition. Here, the threshold value according to the determination of the second condition and the threshold value according to the determination of the first condition in the decision process according to the first example of (1-1) described above may be the same as each other or may be different from each other. That is, the second condition and the first condition in the decision process according to the first example may be the same condition or may be different conditions.

In a case where the number of predetermined objects to be presented to the user is one, that is, the number of options that may be decided is one, the information processing device according to the present embodiment determines whether or not the relative distance satisfies the second condition with respect to one predetermined object.

In addition, for example, in a case in which there are a plurality of predetermined objects to be presented to the user like the objects O1 and O2 illustrated in FIGS. 1A and 1B, that is, in a case in which there are a plurality of options that may be decided, the information processing device according to the present embodiment determines whether or not the relative distance satisfies the second condition with respect to each of the predetermined objects.

Here, in a case in which there are a plurality of predetermined objects to be presented to the user, the information processing device according to the present embodiment does not perform determination on the other objects, for example, "when it is determined that a relative distance between the user and one object among the plurality of predetermined objects satisfies the second condition". Determination is not performed on the other objects as described above, so that exclusive decision of one option is realized in a case in which there are a plurality of options that may be decided.

Note that, in a case in which there are a plurality of predetermined objects to be presented to the user, the information processing device according to the present embodiment may perform determination on the other objects "when it is determined that a relative distance between the user and one object among the plurality of predetermined objects satisfies the second condition". Determination is not performed on the other objects as described above, so that parallel decision of a plurality of options (or independent decision of a plurality of options) is realized in a case in which there are a plurality of options that may be decided.

(2-2) Second Example of Selection Process

The information processing device according to the present embodiment determines whether or not the user is selecting the predetermined object by determining the user's gazing at the predetermined object.

The information processing device according to the present embodiment specifies a position where the user is gazing at in a virtual space on the basis of, for example, data regarding the user's visual line.

In addition, the information processing device according to the present embodiment determines whether or not the user is gazing at the predetermined object on the basis of, for example, "a time for which the specified position where the user is gazing at in the virtual space is included in a region corresponding to the predetermined object in the virtual space" (hereinafter, referred to as "a gaze time").

Here, the region corresponding to the predetermined object in the virtual space may be, for example, a fixed region of which the size and shape are set in advance, or may be a region of which either one or both of the size and shape are changeable on the basis of the user's operation or the like.

The information processing device according to the present embodiment determines whether or not the user is gazing at the predetermined object, for example, on the basis of a result of comparison between the gaze time and a threshold value regarding gaze which is set in advance. The information processing device according to the present embodiment determines that the user is gazing at the predetermined object, for example, in a case in which the gaze time is equal to or greater than the threshold value regarding gaze (or in a case in which the gaze time is greater than the threshold value regarding gaze). In addition, the information processing device according to the present embodiment determines that the user is not gazing at the predetermined object, for example, in a case in which the gaze time is smaller than the threshold value regarding gaze (or in a case in which the gaze time is equal to or less than the threshold value regarding gaze).

The threshold value regarding gaze according to the present embodiment may be a fixed value which is set in advance, or may be a variable value that is changeable on the basis of the user's operation or the like. The information processing device according to the present embodiment specifies the threshold value regarding gaze by reading out data indicating the threshold value regarding gaze from the recording medium such as a storage unit (to be described later).

Note that a method of determining whether or not the user is gazing at the predetermined object is not limited to the above-described example. For example, in a case in which there are a plurality of predetermined objects that may be selected, the information processing device according to the present embodiment may determine that the user is gazing at a predetermined object having the longest gaze time.

The information processing device according to the present embodiment determines whether or not the user is selecting the predetermined object on the basis of a result of determination regarding whether or not the user is gazing at the predetermined object.

More specifically, the information processing device according to the present embodiment determines that the predetermined object is selected in a case in which it is determined that the user is gazing at the predetermined object. In addition, the information processing device according to the present embodiment determines that the predetermined object is not selected in a case in which it is not determined that the user is gazing at the predetermined object.

In addition, the information processing device according to the present embodiment may emphatically display the predetermined object determined to be gazed at by the user. The information processing device according to the present embodiment emphatically displays the predetermined object determined to be gazed at by the user, for example, by one or two or more arbitrary methods capable of emphatically displaying the predetermined object as in an example to be described below. Note that it is needless to say that an example in which a predetermined object determined to be gazed at by a user is emphatically displayed is not limited to the example to be described below.

- A luminance value of a predetermined object determined to be gazed at by a user is increased
- A character included in a predetermined object determined to be gazed at by a user is enlarged
- A predetermined object determined to be gazed at by a user is blinked
- An object (for example, an object surrounding a predetermined object determined to be gazed at by a user by a frame, or the like) indicating being selected is added to the predetermined object determined to be gazed at by the user

(2-3) Third Example of Selection Process

The information processing device according to the present embodiment determines whether or not the user is selecting the predetermined object by determining whether or not the user is approaching the predetermined object.

The information processing device according to the present embodiment determines whether or not the user is approaching the predetermined object, for example, on the basis of a result of comparison between a speed at which the relative distance decreases (hereinafter, referred to as "an approaching speed") and a threshold value regarding the set approaching speed. The information processing device according to the present embodiment determines that the user is approaching the predetermined object, for example, in a case in which the approaching speed is equal to or greater than the threshold value regarding the approaching speed (or in a case in which the approaching speed is greater than the threshold value regarding the approaching speed).

In addition, the information processing device according to the present embodiment determines that the user is not approaching the predetermined object, for example, in a case in which the approaching speed is smaller than the threshold value regarding the approaching speed (or in a case in which the approaching speed is equal to or less than the threshold value regarding the approaching speed).

The threshold value regarding the approaching speed according to the present embodiment may be a fixed value which is set in advance, or may be a variable value that is changeable on the basis of the user's operation or the like. The information processing device according to the present embodiment specifies the threshold value regarding the approaching speed by reading out data indicating the threshold value regarding the approaching speed from the recording medium such as a storage unit (to be described later).

Note that a method of determining whether or not the user is approaching the predetermined object is not limited to the above-described example. For example, in a case in which there are a plurality of predetermined objects that may be selected, the information processing device according to the present embodiment may determine a predetermined object having the highest approaching speed to be the predetermined object that the user is approaching.

The information processing device according to the present embodiment determines whether or not the user is selecting the predetermined object on the basis of a result of determination regarding whether or not the user is approaching the predetermined object.

More specifically, the information processing device according to the present embodiment determines that the predetermined object is selected in a case in which it is determined that the user is approaching the predetermined object. In addition, the information processing device according to the present embodiment determines that the predetermined object is not selected in a case in which it is not determined that the user is approaching the predetermined object.

(2-4) Fourth Example of Selection Process

The information processing device according to the present embodiment can determine whether or not the user is selecting the predetermined object by performing processing obtained by combining two or more of the selection process according to the first example to the selection process according to the third example such as "processing obtained by combining the selection process according to the first example and the selection process according to the second example" and "processing obtained by combining the selection process according to the second example and the selection process according to the third example".

The processing obtained by combination is, for example, "a process of determining that the predetermined object is selected in a case in which it is determined that the predetermined object is selected in one of the selection process according to the first example and the selection process according to the second example". In addition, another example of the processing obtained by combination is "a process of determining that the predetermined object is selected in a case in which it is determined that the predetermined object is selected in both of the selection process according to the first example and the selection process according to the second example".

(2-5) Fifth Example of Selection Process

The information processing device according to the present embodiment determines whether or not the user is selecting the predetermined object by performing a process corresponding to a state (first state) regarding the movement of the user.

Here, the state regarding the movement of the user is, for example, any state related to the user's movement such as movement means of the user, a road on which the user is moving (or a passage, the same applies hereinafter), and conditions of the road on which the user is moving.

The information processing device according to the present embodiment estimates a state regarding the movement of the user, for example, on the basis of data indicating the position of the user. For example, the information processing device according to the present embodiment estimates movement means of the user on the basis of changes in the position for a predetermined time indicated by the data indicating the position of the user. In addition, the information processing device according to the present embodiment estimates a road on which the user is moving, for example, on the basis of the position indicated by the data indicating the position of the user.

Note that a method of estimating a state regarding the movement of the user is not limited to the above-described example.

For example, the information processing device according to the present embodiment may estimate movement means of the user by any processing capable of estimating movement means of the user such as the analysis of a captured image acquired from an imaging device (or an external imaging device of an HMD, the same applies hereinafter) which is included in the HMD worn by the user.

In addition, the information processing device according to the present embodiment may estimate a road on which the user is moving by any processing capable of estimating a road on which the user is moving such as the analysis of a captured image acquired from an imaging device which is included in the HMD worn by the user.

The information processing device according to the present embodiment specifies conditions of the road on which the user is moving, for example, by acquiring data regarding the estimated road on which the user is moving from an external device such as a server.

Here, the data regarding the estimated road on which the user is moving is, for example, any data related to the road (or a passage) such as one or two or more of data indicating a road width, data indicating a jam state (congestion state), and data indicating traffic regulation.

The information processing device according to the present embodiment performs, for example, a process of determining whether or not a condition in which the state regarding the movement of the user is set is satisfied and determining whether or not the user corresponding to a determination result is selecting the predetermined object. Accordingly, the information processing device according to the present embodiment can change the process of determining whether or not the user is selecting the predetermined object on the basis of the state regarding the movement of the user by performing the selection process according to the fifth example.

According to an example of the selection process according to the fifth example, the information processing device according to the present embodiment determines, for example, whether or not the state regarding the movement of the user satisfies a condition related to whether or not the user can run separately at the time of moving (an example of a set condition). Here, a case in which a condition in which the user can run separately at the time of moving is satisfied is, for example, a case in which the user can easily move in the right-left direction (or in the front-back and right-left directions), that is, a case in which the user can easily follow the predetermined object.

The condition in which the user can run separately at the time of moving includes, for example, one or two or more of a road width being equal to or greater than a fixed value, not being congested, and there being no traffic regulation. Note that it is needless to say that the condition in which the user can run separately at the time of moving is not limited to the above-described example.

In a case in which it is determined that the condition in which the user can run separately at the time of moving is satisfied, the information processing device according to the present embodiment performs, for example, the selection process according to the first example of (2-1) described above or the selection process according to the third example of (2-3) described above. Here, it is considered that a case in which the selection process according to the first example of (2-1) described above is performed when the user can run separately at the time of moving is more suitable for a case in which the user does not desire to disturb a running pace as much as possible in the case of selection. In addition, it is considered that a case in which the selection process according to the third example of (2-3) described above is performed when the user can run separately at the time of moving is more suitable for a case in which the user desires to reduce a time required for selection as much as possible.

Further, in a case in which it is not determined that the condition in which the user can run separately at the time of moving is satisfied, the information processing device according to the present embodiment performs, for example, the selection process according to the second example of (2-2) described above.

Note that it is needless to say that an example of the selection process according to the fifth example is not limited to the above-described example.

(2-6) Sixth Example of Selection Process

The information processing device according to the present embodiment may determine whether or not the user is selecting the predetermined object on the basis of a result of recognition of a sound corresponding to an option.

For example, according to the use case illustrated in FIGS. 1A and 1B, the information processing device according to the present embodiment determines that the object O1 has been selected in a case in which a sound of "Training" is recognized, and determines that the object O2 has been selected in a case in which recognition of "Navi" (or "Navigation") is detected. Here, a process according to the recognition of a sound may be performed by the information processing device according to the present embodiment, or may be performed by an external device of the information processing device according to the present embodiment. The information processing device according to the present embodiment performs determination based on a result of recognition of a sound with reference to, for example, "a table (or a database) in which a character string corresponding to a result of recognition of a sound and an option (or predetermined object) are associated with each other" which is stored in the recording medium.

Note that the information processing device according to the present embodiment can perform the selection process according to the sixth example in addition to the selection process according to the first example of (2-1) described above to the selection process according to the fifth example of (2-5) described above.

(2-7) Seventh Example of Selection Process

The information processing device according to the present embodiment may determine whether or not the user is selecting the predetermined object, for example, on the basis of the direction or posture of a portion of the body such as the head or face of the user, the direction or posture of the whole body of the user, or an operation of at least a portion of the body such as the head of the user.

In addition, the information processing device according to the present embodiment may determine whether or not the user is selecting the predetermined object, for example, on the basis of information indicating the user's operation of a steering member (for example, a handle) of a vehicle. The operation of the steering member is detected or estimated by any method capable of detecting or estimating an operation of the steering member such as a method using an image recognition result regarding a captured image obtained by imaging the steering member or a method using a detection result of a sensor detecting the movement of the steering member.

An index used for determination of the selection of the predetermined object according to another example described above may be defined as "a gesture" or "an action recognition result". In addition, the index used for determination of the selection of the predetermined object according to another example described above may also be similarly applied in video expression in virtual reality (VR).

Note that the information processing device according to the present embodiment can perform the selection process according to the seventh example in addition to the selection process according to the first example of (2-1) described above to the selection process according to the sixth example of (2-6) described above.

The information processing device according to the present embodiment performs, for example, any one process of a selection process according to the above-described first example of (2-1) to a selection process according to the above-described seventh example of (2-7) as a selection process.

Note that the selection process according to the present embodiment is not limited to the above-described examples.

For example, the information processing device according to the present embodiment can also cancel the selection of the selected predetermined object by further determining whether or not a predetermined cancellation condition is satisfied.

The information processing device according to the present embodiment cancels the selection of the selected predetermined object in a case in which it is determined that a cancellation condition is satisfied.

Here, the cancellation condition according to the present embodiment is, for example, a condition in which a state where a relative distance between the user and the selected predetermined object satisfies the second condition is not set, a condition in which a state where the user is not gazing at the selected predetermined object is set is maintained for a predetermined time, a combination thereof, or the like. Note that it is needless to say that an example of the cancellation condition according to the present embodiment is not limited to the above-described example.

(3) Presentation Control Process

The information processing device according to the present embodiment performs a process of controlling the presentation of a predetermined object.

Here, the process of controlling the presentation of a predetermined object is, for example, one or two or more of a presentation control process according to a first example of (3-1) to be described below to a presentation control process according to a fourth example of (3-4) to be described below.

(3-1) First Example of Presentation Control Process

The information processing device according to the present embodiment presents a predetermined object in a case in which a set presentation start condition is satisfied.

The presentation start condition according to the present embodiment is, for example, either one or both of the detection of a predetermined operation of a user and the detection of a predetermined state regarding the movement of the user. Here, the predetermined state regarding the movement of the user is, for example, the user riding any vehicle (an example of movement means) such as a bicycle or a two-wheels self balance electric scooter, a moving speed of the user being equal to or higher than a set speed, communication being started between the information processing device according to the present embodiment and a vehicle (an example of movement means) such as a bicycle, or the like. The user riding a vehicle (an example of movement means) such as a bicycle is estimated, for example, by analyzing a captured image or estimating the movement means of the user. Note that, for example, in a case in which the detection of the predetermined operation of the user or the moving speed of the user being equal to or higher than a set speed is set to be the presentation start condition, the movement of the user may be the movement of the user riding a vehicle, or may be the movement of the user not riding a vehicle (for example, movement through running or walking). That is, the movement of the user according to the present embodiment includes the movement of the user riding a vehicle and the movement of the user not riding a vehicle.

(3-2) Second Example of Presentation Control Process

The information processing device according to the present embodiment controls the number of predetermined objects to be presented to the user at once. The information processing device according to the present embodiment can change the number of predetermined objects to be presented to the user at once by performing the presentation control process according to the second example.

The information processing device according to the present embodiment controls the number of predetermined objects to be presented to the user on the basis of the number of options N (N is an integer of 1 or greater) and the number of options Thresh to be presented to the user at once (Thresh is an integer of 1 or greater).

Here, the number of options N is, for example, a fixed number of options which is set in advance, the number of options associated with the user (the number of options for each user), the number of options changeable on the basis of the user's operation or the like, or the like.

The number of options associated with the user is specified with reference to, for example, "a table (or a database)

in which information indicating the user (for example, a user ID, data indicating an authentication result obtained by any authentication method such as biometric authentication, or the like) and data indicating an option to be presented are associated with each other. The information processing device according to the present embodiment specifies the number of options associated with the user with reference to the table stored in the recording medium such as a storage unit (to be described later).

Further, in a case in which a predetermined object to be presented to the user is changed on the basis of a state regarding the movement of the user as described in the presentation control process according to the third example to be described later, the information processing device according to the present embodiment can dynamically change the number of options associated with the user in accordance with the predetermined object to be presented to the user. That is, the number of options associated with the user may be dynamically changed on the basis of the state regarding the movement of the user.

The number of options Thresh to be presented to the user at once is, for example, a fixed number of options which is set in advance or the number of options associated with a display device on which the predetermined object is displayed.

The number of options associated with the display device is specified with reference to, for example, "a table (or a database) in which information indicating the display device (for example, a device ID, data indicating the size, resolution, and the like of a display screen, or the like) and data indicating the number of options capable of being presented are associated with each other". The information processing device according to the present embodiment specifies the number of options associated with the display device with reference to the table stored in the recording medium such as a storage unit (to be described later).

Note that the number of options Thresh to be presented to the user at once is not limited to the above-described example.

For example, the number of options Thresh to be presented to the user at once may be dynamically changed on the basis of a state regarding the movement of the user (second state). Here, the state regarding the movement of the user which is used in the presentation control process according to the second example may be the same as or different from the state regarding the movement of the user which is used in the selection process according to the fifth example of (2-5) described above. The information processing device according to the present embodiment specifies the number of options Thresh corresponding to the state regarding the movement of the user with reference to, for example, "a table (or a database) in which a combination of the states regarding the movement of the user and the number of options Thresh to be presented to the user at once are associated with each other" which is stored in the recording medium.

As described above, in a case in which the number of options Thresh to be presented to the user at once is dynamically changed on the basis of the state regarding the movement of the user, the information processing device according to the present embodiment can dynamically control the number of predetermined objects to be presented to the user on the basis of the state regarding the movement of the user.

(i) In a case in which the number of options Thresh to be presented to the user at once is equal to or greater than the number of options N In a case in which the number of options Thresh to be presented to the user at once is equal to or greater than the number of options N, it is possible to present predetermined objects corresponding to all of the options to the user at once.

Accordingly, in a case in which the number of options Thresh to be presented to the user at once is equal to or greater than the number of options N, the information processing device according to the present embodiment displays the predetermined objects corresponding to all of the options on the display screen.

(ii) In a case in which the number of options Thresh to be presented to the user at once is smaller than the number of options N In a case in which the number of options Thresh to be presented to the user at once is smaller than the number of options N, that is, in a case in which the number of predetermined objects to be presented is smaller than the number of options, it is not possible to present predetermined objects corresponding to all of the options to the user at once.

Accordingly, in a case in which the number of options Thresh to be presented to the user at once is smaller than the number of options N, the information processing device according to the present embodiment switches and presents a predetermined object to be presented and a predetermined object not to be presented.

The information processing device according to the present embodiment switches and presents predetermined objects, for example, by the rotation and display of a plurality of predetermined objects, the display of a plurality of predetermined objects in a hierarchical manner (or in a stepwise manner), a combination thereof, or the like.

Here, the information processing device according to the present embodiment realizes "the rotation and display of a plurality of predetermined objects", for example, by changing a predetermined object to be displayed on the display screen whenever a predetermined time elapses. In addition, the information processing device according to the present embodiment may realize "the rotation and display of a plurality of predetermined objects", for example, by changing a predetermined object to be displayed on the display screen in a case in which the user's gaze at an object to be rotated is detected.

In addition, the information processing device according to the present embodiment realizes "the display of a plurality of predetermined objects in a hierarchical manner (or in a stepwise manner)", for example, by changing a predetermined object to be displayed on the display screen on the basis of a change in a moving speed of the user.

Note that it is needless to say that a method of switching and presenting predetermined objects is not limited to the above-described example, (3-3) Third Example of Presentation Control Process The information processing device according to the present embodiment changes a predetermined object to be presented to the user on the basis of the state regarding the movement of the user (third state).

The information processing device according to the present embodiment changes a predetermined object to be presented to the user, for example, by specifying a predetermined object to be presented to the user in accordance with the state regarding the movement of the user and a predetermined object not to be presented to the user in accordance with the state regarding the movement of the user. Here, the state regarding the movement of the user which is used in the presentation control process according to the third example may be the same as or different from the state regarding the movement of the user which is used in the selection process according to the fifth example of (2-5) described above (or the state regarding the movement of the user which is used in the presentation control process according to the third example of (3-2) described above).

The information processing device according to the present embodiment specifies a predetermined object to be presented to the user in accordance with the state regarding the movement of the user with reference to, for example, "a table (or a database) in which the state regarding the movement of the user and data indicating a predetermined object to be presented to the user are associated with each other" which is stored in the recording medium. In addition, the information processing device according to the present embodiment specifies a predetermined object not to be presented to the user in accordance with the state regarding the movement of the user with reference to, for example, "a table (or a database) in which the state regarding the movement of the user and data indicating a predetermined object not to be presented to the user are associated with each other" which is stored in the recording medium.

The presentation control process according to the third example is performed, so that dynamic presentation of a predetermined object according to, for example, a road width, a jam state, traffic regulation, and the like (examples of the state regarding the movement of the user) is realized.

(3-4) Fourth Example of Presentation Control Process

The information processing device according to the present embodiment changes a method of presenting a predetermined object on the basis of a result of the process (selection process) of (2) described above.

As an example, the information processing device according to the present embodiment emphatically displays, for example, a predetermined object selected in the process (selection process) of (2) described above. The information processing device according to the present embodiment emphatically displays the selected predetermined object, for example, by one or two or more arbitrary methods capable of emphasizing a predetermined object as in an example to be described below. Note that it is needless to say that an example in which a selected predetermined object is emphatically displayed is not limited to an example to be described below.

- A luminance value of a selected predetermined object is increased
- A character included in a selected predetermined object is enlarged
- A selected predetermined object is blinked
- An object (for example, an object surrounding a selected predetermined object by a frame, or the like) indicating being selected is added to the selected predetermined object It is possible to notify the user that a predetermined object has been selected (the predetermined object is brought into focus) by emphatically displaying the selected predetermined object as described above.

In addition, the information processing device according to the present embodiment may output a sound indicating being selected from a sound output device included in the HMD worn by the user (or an external sound output device of the HMD, the same applies hereinafter) so that the sound is heard from a position corresponding to the position of a selected predetermined object in a virtual space.

As another example, the information processing device according to the present embodiment performs non-emphatic display, for example, on a predetermined object that has not been selected or a predetermined object of which the selection has been cancelled in the process (selection process) of (2) described above. The information processing device according to the present embodiment performs non-emphatic display on a predetermined object that has not been selected or a predetermined object of which the selection has been cancelled by any method not capable of emphasizing a predetermined object such as fade-out display of a predetermined object that has not been selected or a predetermined object of which the selection has been cancelled. The fade-out display of a predetermined object is realized, for example, by a change of the size of the predetermined object, a change of the transmittance of the predetermined object, a reduction in a moving speed of the predetermined object a combination thereof, or the like.

As a still another example, the information processing device according to the present embodiment may dynamically change the degree of emphatic display of a predetermined object which is likely to be selected and the degree of non-emphatic display of a predetermined object which is unlikely to be selected, for example, in accordance with the state of the process (selection process) of (2) described above. The information processing device according to the present embodiment performs, for example, arithmetic operation of any algorithm capable of obtaining reliability regarding whether or not selection has been performed in accordance with the state of the process (selection process) of (2) described above, and changes the degree of emphatic display and the degree of non-emphatic display on the basis of the reliability which is set for each predetermined object.

(4) Execution Control Process

The information processing device according to the present embodiment controls execution of a process corresponding to an option which is decided through the process (decision process) of (1) described above.

The information processing device according to the present embodiment performs, for example, "an execution control process according to a first example of (4-1) to be described below" or "the execution control process according to the first example of (4-1) to be described below and an execution control process according to a second example of (4-2) to be described below".

(4-1) First Example of Execution Control Process

The information processing device according to the present embodiment executes, for example, a process corresponding to an option which is decided through the process (decision process) of (1) described above.

The information processing device according to the present embodiment specifies a process corresponding to a decided option with reference to, for example, "a table (or a database) in which an option and processing to be executed are associated with each other" which is stored in the recording medium. In addition, the information processing device according to the present embodiment executes the specified processing.

Note that it is needless to say that a method of executing a process corresponding to a decided option is not limited to the above-described example.

(4-2) Second Example of Execution Control Process

The information processing device according to the present embodiment stops, for example, the execution of a process corresponding to an option being executed (the execution of a process corresponding to an option decided through the process (decision process) of (1) described above).

For example, the information processing device according to the present embodiment determines whether or not a predetermined stop condition is satisfied, and stops the execution of a process corresponding to an option being executed, in a case in which it is determined that the predetermined stop condition is satisfied.

Here, the stop condition according to the present embodiment is, for example, a condition in which a state where a distance between the user and the selected predetermined object satisfies a first condition is not set, a condition in which the user gets off a vehicle (an example of movement means) such as a bicycle, a combination thereof, or the like. The user getting off a vehicle (an example of movement means) such as a bicycle is estimated, for example, by the analysis of a captured image or on the basis of a change in a position indicated by data indicating the position of the user for a predetermined time.

Note that it is needless to say that an example of the stop condition according to the present embodiment is not limited to the above-described example.

In addition, the stop condition according to the present embodiment may be dynamically changed, for example, on the basis of the state regarding the movement of the user. As an example, in a case in which a road on which the user is moving is in a congested state or a traffic regulation state, the information processing device according to the present embodiment makes it difficult to stop the execution of a process corresponding to an option being executed by setting a more severe stop condition.

[3] Specific Example of Process According to Information Processing Method According to the Present Embodiment Next, a specific example of the above-described process according to the information processing method according to the present embodiment will be described. Hereinafter, as an example of a process according to the information processing method according to the present embodiment, an example of processing in "a use case in which the user decides an option while riding a vehicle such as a bicycle" will be described.

Figure 2:
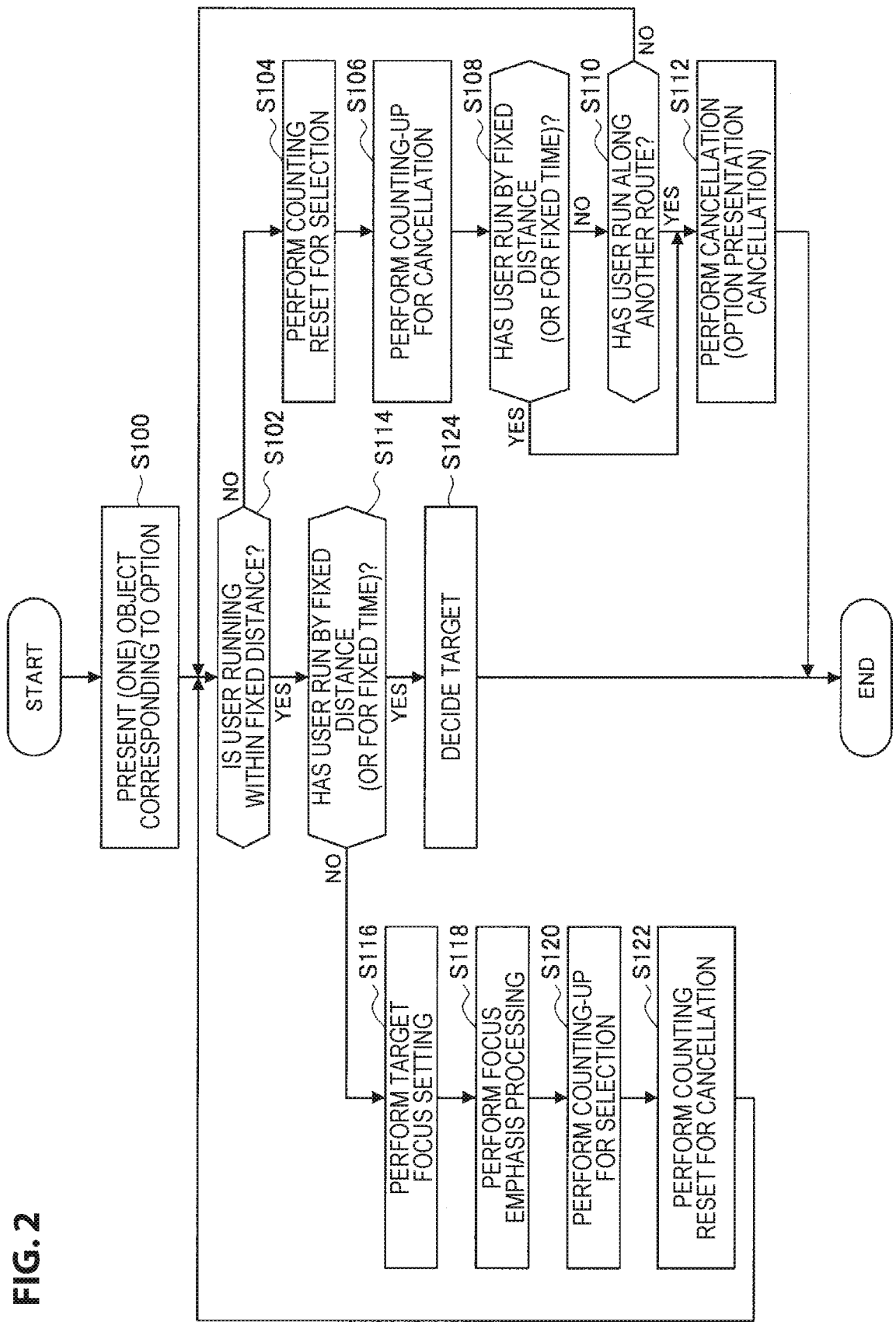
FIG. 2 is a flow diagram illustrating a first example of a process according to the information processing method according to the present embodiment.

[3-1] First Example of Process According to Information Processing Method According to the Present Embodiment FIG. 2 is a flow diagram illustrating a first example of a process according to the information processing method according to the present embodiment. FIG. 2 illustrates an example of processing in a case in which one predetermined object is presented, that is, a case in which the number of options that may be decided is one.

The information processing device according to the present embodiment presents a predetermined object corresponding to an option (S100). The information processing device according to the present embodiment presents the predetermined object corresponding to the option, for example, by performing the presentation process according to the first example of (3-1) described above.

The information processing device according to the present embodiment determines whether or not the user is running within a fixed distance from the predetermined object (S102). The information processing device according to the present embodiment determines whether or not the user is running within the fixed distance from the predetermined object, for example, by performing the first determination process of (I) described above. Here, in the first determination process of (I) described above, a case in which it is determined that a state where the relative distance satisfies the first condition is set corresponds to a case in which it is determined that the user is running within the fixed distance from the predetermined object.

In a case in which it is not determined in step S102 that the user is running within the fixed distance from the predetermined object, the information processing device according to the present embodiment performs counting reset for selection (S104). The counting reset for selection corresponds to counting reset of a running distance for selection (or a running time for selection). The information processing device according to the present embodiment performs counting reset for selection, for example, by setting a counter for selection to an initial value.

In addition, the information processing device according to the present embodiment performs counting-up for cancellation (S106). The counting-up for cancellation corresponds to counting-up of a distance for cancellation (or a running time for cancellation). The information processing device according to the present embodiment performs counting-up for cancellation, for example, by performing update so as to increase the value of the counter for cancellation.

Here, FIG. 2 illustrates an example in which the process of step S106 is performed after the process of step S104, but the information processing device according to the present embodiment may perform the process of step S104 and the process of step S106 in parallel. In addition, the information processing device according to the present embodiment can also perform the process of step S104 after the process of step S106.

The information processing device according to the present embodiment determines whether or not the user has run by a fixed distance (or for a fixed time) (S108). The information processing device according to the present embodiment determines whether or not the user has run by the fixed distance (or for the fixed time), for example, by comparing the value of the counter for cancellation and a set threshold value with each other. The information processing device according to the present embodiment determines that the user has run by the fixed distance (or for the fixed time), for example, in a case in which the value of the counter for cancellation is equal to or greater than the threshold value or in a case in which the value of the counter for cancellation is greater than the threshold value.

Note that the process of step S108 is not limited to the above-described example. For example, the information processing device according to the present embodiment may determine whether or not the user has run by the fixed distance by comparing "a Euclidean distance between the position of the user in a virtual space at a first point in time and the position of the user in the virtual space at a second point in time after the first point in time" and a set threshold value with each other. In addition, the information processing device according to the present embodiment may determine whether or not the user has run for the fixed time, for example, by comparing a time between the first point in time and the second point in time and a set threshold value with each other. The first point in time in the process of step S108 is, for example, a point in time when the determination of step S102 is performed, points in time when the process of step S104 and the process of step S106 are completed, or the like.

In a case in which it is determined in step S108 that the user has run by the fixed distance (or for the fixed time), the information processing device according to the present embodiment performs the process of step S112 to be described later.

Further, in a case in which it is not determined in step S108 that the user has run by the fixed distance (or for the fixed time), the information processing device according to the present embodiment determines whether or not the user is running along another route (S110). The information processing device according to the present embodiment determines whether or not the user is running along another route, for example, on the basis of data indicating the position of the user.

In a case in which it is determined in step S110 that the user is running along another route or in a case in which is determined in step S108 that the user has run by the fixed distance (or for the fixed time), the information processing device according to the present embodiment performs a process of cancelling the presentation of an option (S112). The information processing device according to the present embodiment cancels the presentation of the option by performing non-emphatic display on a predetermined object corresponding to the option, for example, as shown in the presentation control process according to the fourth example of (3-4) described above.

In addition, the information processing device according to the present embodiment terminates the processing illustrated in FIG. 2.

Further, in a case in which it is not determined in step S110 that the user is running along another route, the information processing device according to the present embodiment repeats the processes from step S102.

In a case in which it is determined in step S102 that the user is running within the fixed distance from the predetermined object, the information processing device according to the present embodiment determines whether or not the user has run by the fixed distance (or for the fixed time) (S114).

The information processing device according to the present embodiment determines whether or not the user has run by the fixed distance (or for the fixed time), for example, by comparing the value of the counter for selection and a set threshold value with each other. The information processing device according to the present embodiment determines that the user has run by the fixed distance (or for the fixed time), for example, in a case in which the value of the counter for selection is equal to or greater than the threshold value or in a case in which the value of the counter for selection is greater than the threshold value.

Note that the process of step S114 is not limited to the above-described example. For example, the information processing device according to the present embodiment may determine whether or not the user has run by the fixed distance by comparing "a Euclidean distance between the position of the user in a virtual space at a first point in time and the position of the user in the virtual space at a second point in time after the first point in time" and a set threshold value with each other. In addition, the information processing device according to the present embodiment may determine whether or not the user has run for the fixed time, for example, by comparing a time between the first point in time and the second point in time and a set threshold value with each other. Here, the first point in time in the process of step S114 is, for example, a point in time when the determination of step S102 is performed, or the like.

In a case in which it is not determined in step S114 that the user has run by the fixed distance (or for the fixed time), the information processing device according to the present embodiment performs target focus setting (S116). The information processing device according to the present embodiment performs, for example, the selection process according to the first example of (2-1) described above in step S116.

When the process of step S116 is performed, the information processing device according to the present embodiment performs focus emphasis processing (S118). The information processing device according to the present embodiment emphatically displays a predetermined object, for example, as shown in the presentation control process according to the fourth example of (3-4) described above.

The information processing device according to the present embodiment performs counting-up for selection (S120). The counting-up for selection corresponds to counting-up of a distance for selection (or a running time for selection). The information processing device according to the present embodiment performs counting-up for selection, for example, by performing update so as to increase the value of the counter for selection.

In addition, the information processing device according to the present embodiment performs counting reset for cancellation (S122). The counting reset for cancellation corresponds to counting reset of a running distance for cancellation (or a running time for cancellation). The information processing device according to the present embodiment performs counting reset for cancellation, for example, by setting the value of the counter for cancellation to an initial value.

In addition, the information processing device according to the present embodiment repeats the processes from step S102.

Here, FIG. 2 illustrates an example in which the process of step S122 is performed after the process of step S120, but the information processing device according to the present embodiment may perform the process of step S120 and the process of step S122 in parallel. In addition, the information processing device according to the present embodiment can also perform the process of step S120 after the process of step S122.

In a case in which it is determined in step S114 that the user has run by the fixed distance (or for the fixed time), the information processing device according to the present embodiment decides an option corresponding to the predetermined object (target) presented in step S100 (S124). In addition, the information processing device according to the present embodiment terminates the processing illustrated in FIG. 2.

In a case in which the number of options that may be decided is one, the information processing device according to the present embodiment performs, for example, the processing illustrated in FIG. 2. Note that it is needless to say that processing in a case in which the number of options that may be decided is one is not limited to the example illustrated in FIG. 2.

Figure 3:
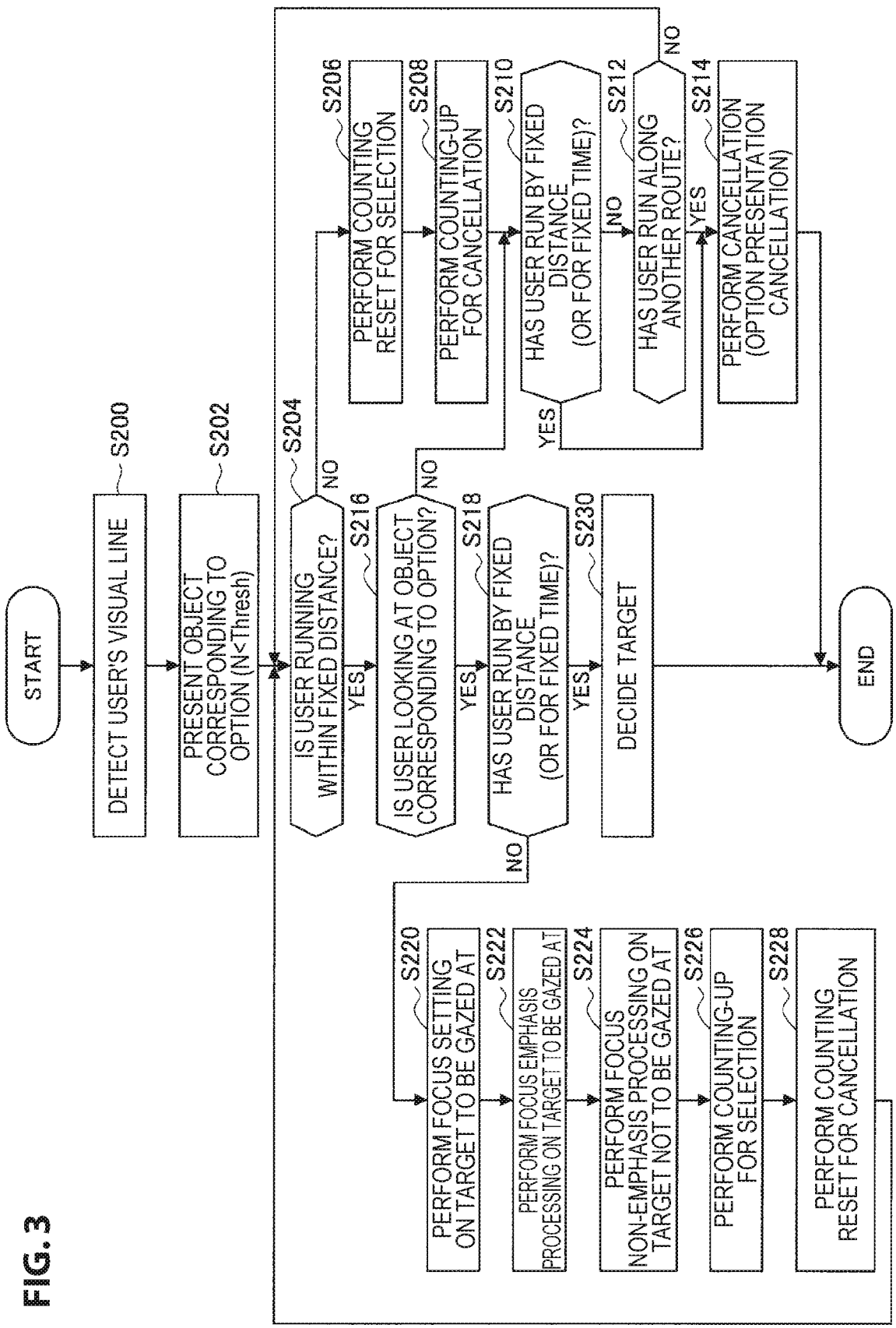
FIG. 3 is a flow diagram illustrating a second example of a process according to the information processing method according to the present embodiment.

[3-2] Second Example of Process According to Information Processing Method According to the Present Embodiment FIG. 3 is a flow diagram illustrating a second example of a process according to the information processing method according to the present embodiment. FIG. 3 illustrates an example of processing in a case in which the number of options Thresh to be presented to a user at once is equal to or greater than the number of options N and the user cannot run separately at the time of moving. FIG. 3 illustrates an example of processing in a case in which there are a plurality of options that may be decided.

The information processing device according to the present embodiment detects the user's visual line (S200).

The information processing device according to the present embodiment presents a predetermined object corresponding to an option (S202). The information processing device according to the present embodiment presents the predetermined object corresponding to the option, for example, by performing the presentation process according to the first example of (3-1) described above and the presentation process according to the second example of (3-2) described above.

The information processing device according to the present embodiment determines whether or not the user is running within a fixed distance from a predetermined object, for example, similar to step S102 illustrated in FIG. 2 (S204).

In a case in which it is not determined in step S204 that the user is running within the fixed distance from the predetermined object, the information processing device according to the present embodiment performs counting reset for selection, for example, similar to step S104 illustrated in FIG. 2 (S206). In addition, the information processing device according to the present embodiment performs counting-up for cancellation, for example, similar to step S106 illustrated in FIG. 2 (S208).

Here, FIG. 3 illustrates an example in which the process of step S208 is performed after the process of step S206, but the information processing device according to the present embodiment may perform the process of step S206 and the process of step S208 in parallel. In addition, the information processing device according to the present embodiment can also perform the process of step S206 after the process of step S208.

The information processing device according to the present embodiment determines whether or not the user has run by a fixed distance (or for a fixed time), for example, similar to step S108 illustrated in FIG. 2 (S210).

In a case in which it is determined in step S210 that the user has run by the fixed distance (or for the fixed time), the information processing device according to the present embodiment performs the process of step S214 to be described later.

Further, in a case in which it is not determined in step S210 that the user has run by the fixed distance (or for the fixed time), the information processing device according to the present embodiment determines whether or not the user is running along another route, for example, similar to step S110 illustrated in FIG. 2 (S212).

In a case in which it is determined in step S212 that the user is running along another route or in a case in which it is determined in step S210 that the user has run by the fixed distance (or for the fixed time), the information processing device according to the present embodiment performs a process of cancelling the presentation of an option, for example, similar to step S112 illustrated in FIG. 2 (S214).

In addition, the information processing device according to the present embodiment terminates the processing illustrated in FIG. 3.

Further, in a case in which it is not determined in step S212 that the user is running along another route, the information processing device according to the present embodiment repeats the processes from step S204.

In a case in which it is determined in step S204 that the user is running within the fixed distance from the predetermined object, the information processing device according to the present embodiment determines whether or not the user is looking at a predetermined object corresponding to an option (S216). The information processing device according to the present embodiment determines whether or not the user is looking at the predetermined object corresponding to the option by determining the user's gaze at the predetermined object, for example, as shown in the selection process according to the second example of (2-2) described above. Here, the information processing device according to the present embodiment determines that the user is looking at the predetermined object corresponding to the option in a case in which it is determined that the user is gazing at the predetermined object.

In a case in which it is not determined in step S216 that the user is looking at the predetermined object corresponding to the option, the information processing device according to the present embodiment performs the process of step S210.

Further, in a case in which it is determined in step S216 that the user is looking at the predetermined object corresponding to the option, the information processing device according to the present embodiment determines whether or not the user has run by the fixed distance (or for the fixed time), for example, similar to step S114 illustrated in FIG. 2 (S218).

In a case in which it is not determined in step S218 that the user has run by the fixed distance (or for the fixed time), the information processing device according to the present embodiment performs focus setting on a predetermined object (target to be gazed at) determined to be gazed at by the user, for example, similar to step S116 illustrated in FIG. 2 (S220).

When the process of step S220 is performed, the information processing device according to the present embodiment performs focus emphasis processing on the predetermined object (target to be gazed at) determined to be gazed at by the user, for example, similar to step S118 illustrated in FIG. 2 (S222).

The information processing device according to the present embodiment performs counting-up for selection, for example, similar to step S120 illustrated in FIG. 2 (S226). In addition, the information processing device according to the present embodiment performs counting reset for cancellation, for example, similar to step S122 illustrated in FIG. 2 (S228). In addition, the information processing device according to the present embodiment repeats the processes from step S204.

Here, FIG. 3 illustrates an example in which the process of step S228 is performed after the process of step S226, but the information processing device according to the present embodiment may perform the process of step S226 and the process of step S228 in parallel. In addition, the information processing device according to the present embodiment can also perform the process of step S226 after the process of step S228.

In a case in which it is determined in step S218 that the user has run by the fixed distance (or for the fixed time), the information processing device according to the present embodiment decides an option corresponding to the predetermined object (target to be gazed at) determined to be gazed at by the user in step S216 (S230). In addition, the information processing device according to the present embodiment terminates the processing illustrated in FIG. 3.

In a case in which the number of options Thresh to be presented to the user at once is equal to or greater than the number of options N and the user cannot run separately at the time of moving (in a case in which there are a plurality of options that may be decided), the information processing device according to the present embodiment performs, for example, the processing illustrated in FIG. 3. Note that it is needless to say that processing in a case in which the number of options Thresh to be presented to the user at once is equal to or greater than the number of options N and the user cannot run separately at the time of moving is not limited to the example illustrated in FIG. 3.

Figure 4:
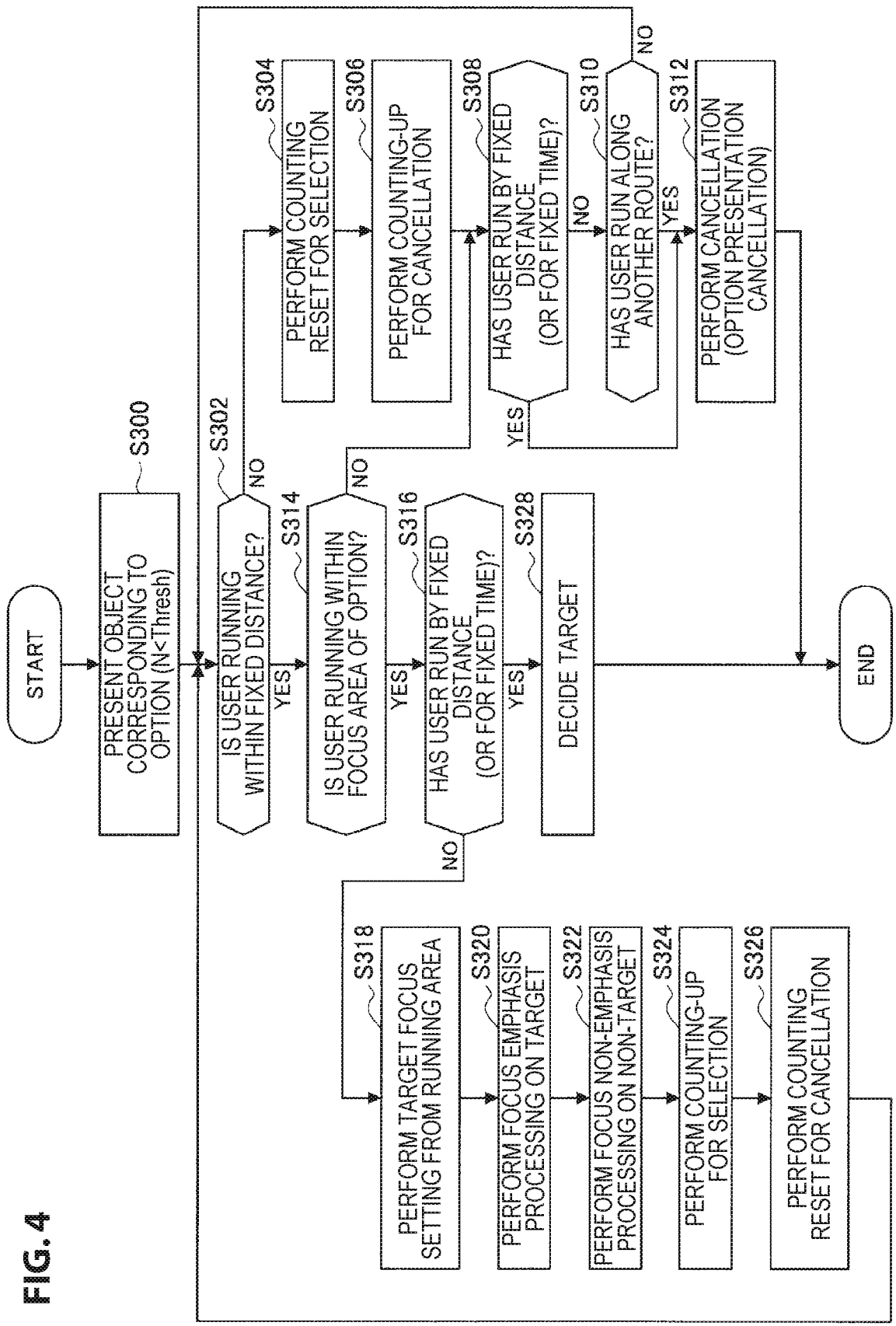
FIG. 4 is a flow diagram illustrating a third example of a process according to the information processing method according to the present embodiment.

[3-3] Third Example of Process According to Information Processing Method According to the Present Embodiment FIG. 4 is a flow diagram illustrating a third example of a process according to the information processing method according to the present embodiment. FIG. 4 illustrates an example of processing in a case in which the number of options Thresh to be presented to a user at once is equal to or greater than the number of options N and the user can run separately at the time of moving. FIG. 4 illustrates another example of processing in a case in which there are a plurality of options that may be decided.

The information processing device according to the present embodiment presents a predetermined object corresponding to an option, for example, similar to step S202 illustrated in FIG. 3 (S300).

The information processing device according to the present embodiment determines whether or not the user is running within a fixed distance from a predetermined object, for example, similar to step S102 illustrated in FIG. 2 (S302).

In a case in which it is not determined in step S302 that the user is running within the fixed distance from the predetermined object, the information processing device according to the present embodiment performs counting reset for selection, for example, similar to step S104 illustrated in FIG. 2 (S304). In addition, the information processing device according to the present embodiment performs counting-up for cancellation, for example, similar to step S106 illustrated in FIG. 2 (S306).

Here, FIG. 4 illustrates an example in which the process of step S306 is performed after the process of step S304, but the information processing device according to the present embodiment may perform the process of step S304 and the process of step S306 in parallel. In addition, the information processing device according to the present embodiment can also perform the process of step S304 after the process of step S306.

The information processing device according to the present embodiment determines whether or not the user has run by a fixed distance (or for a fixed time), for example, similar to step S108 illustrated in FIG. 2 (S308).

In a case in which it is determined in step S308 that the user has run by the fixed distance (or for the fixed time), the information processing device according to the present embodiment performs the process of step S312 to be described later.

Further, in a case in which it is not determined in step S308 that the user has run by the fixed distance (or for the fixed time), the information processing device according to the present embodiment determines whether or not the user is running along another route, for example, similar to step S110 illustrated in FIG. 2 (S310).

In a case in which it is determined in step S310 that the user is running along another route or in a case in which it is determined in step S308 that the user has run by the fixed distance (or for the fixed time), the information processing device according to the present embodiment performs a process of cancelling the presentation of an option, for example, similar to step S112 illustrated in FIG. 2 (S312).

In addition, the information processing device according to the present embodiment terminates the processing illustrated in FIG. 4.

Further, in a case in which it is not determined in step S310 that the user is running along another route, the information processing device according to the present embodiment repeats the processes from step S302.

In a case in which it is determined in step S302 that the user is running within the fixed distance from the predetermined object, the information processing device according to the present embodiment determines whether or not the user is running within a focus area of the option (S314). The information processing device according to the present embodiment determines whether or not the user is running within the focus area of the option by determining whether or not the relative distance satisfies the second condition, for example, as shown in the selection process according to the first example of (2-1) described above. Here, the information processing device according to the present embodiment determines that the user is running within the fixed distance from the predetermined object in a case in which it is determined that a state where the relative distance satisfies the second condition is set.

In a case in which it is not determined in step S314 that the user is running within the fixed distance from the predetermined object, the information processing device according to the present embodiment performs the process of step S308.

Further, in a case in which it is determined in step S314 that the user is running within the fixed distance from the predetermined object, the information processing device according to the present embodiment determines whether or not the user has run by the fixed distance (or for the fixed time), for example, similar to step S114 illustrated in FIG. 2 (S316).

In a case in which it is not determined in step S316 that the user has run by the fixed distance (or for the fixed time), the information processing device according to the present embodiment performs focus setting on the predetermined object (target) in which the user is determined to run within the focus area of the option, for example, similar to step S116 illustrated in FIG. 2 (S318).

When the process of step S318 is performed, the information processing device according to the present embodiment performs focus emphasis processing on the predetermined object (target) in which the user is determined to run within the focus area of the option, for example, similar to step S118 illustrated in FIG. 2 (S320).

The information processing device according to the present embodiment performs counting-up for selection, for example, similar to step S120 illustrated in FIG. 2 (S324). In addition, the information processing device according to the present embodiment performs counting reset for cancellation, for example, similar to step S122 illustrated in FIG. 2 (S326). In addition, the information processing device according to the present embodiment repeats the processes from step S302.

Here, FIG. 4 illustrates an example in which the process of step S326 is performed after the process of step S324, but the information processing device according to the present embodiment may perform the process of step S324 and the process of step S326 in parallel. In addition, the information processing device according to the present embodiment can also perform the process of step S324 after the process of step S326.

In a case in which it is determined in step S316 that the user has run by the fixed distance (or for the fixed time), the information processing device according to the present embodiment decides an option corresponding to the predetermined object (target) in which the user is determined to run within the focus area of the option in step S314 (S328). In addition, the information processing device according to the present embodiment terminates the processing illustrated in FIG. 4.

In a case in which the number of options Thresh to be presented to the user at once is equal to or greater than the number of options N and the user can run separately at the time of moving (in a case in which there are a plurality of options that may be decided), the information processing device according to the present embodiment performs, for example, the processing illustrated in FIG. 4. Note that it is needless to say that processing in a case in which the number of options Thresh to be presented to the user at once is equal to or greater than the number of options N and the user can run separately at the time of moving is not limited to the example illustrated in FIG. 3.

Figure 5:
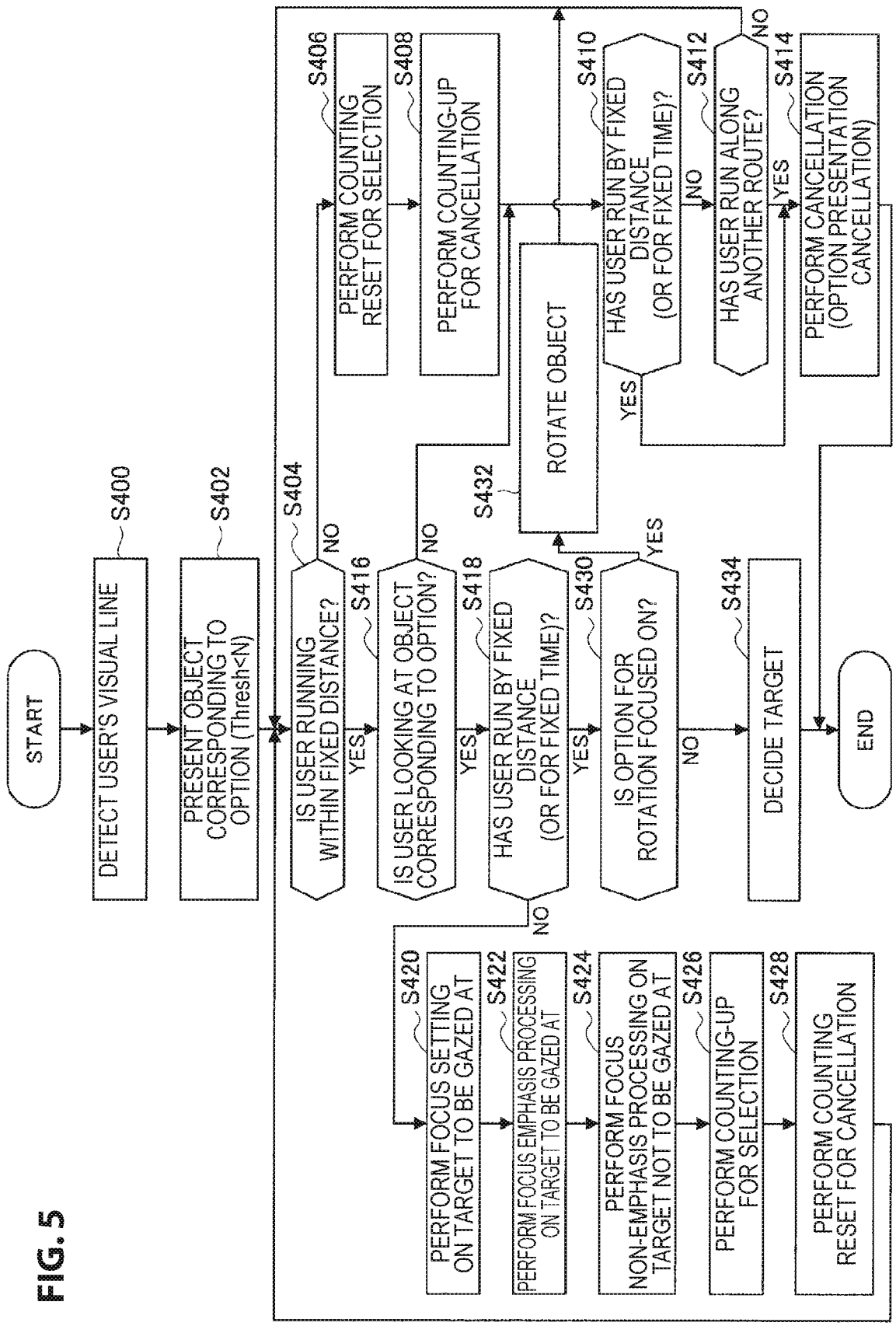
FIG. 5 is a flow diagram illustrating a fourth example of a process according to the information processing method according to the present embodiment.

[3-4] Fourth Example of Process According to Information Processing Method According to the Present Embodiment FIG. 5 is a flow diagram illustrating a fourth example of a process according to the information processing method according to the present embodiment. FIG. 5 illustrates an example of processing in a case in which the number of options N is greater than the number of options Thresh to be presented to a user at once and the user cannot run separately at the time of moving. FIG. 5 further illustrates another example of processing in a case in which there are a plurality of options that may be decided.

The information processing device according to the present embodiment detects the user's visual line (S400).

The information processing device according to the present embodiment presents a predetermined object corresponding to an option, for example, similar to step S202 illustrated in FIG. 3 (S402).

The information processing device according to the present embodiment determines whether or not the user is running within a fixed distance from a predetermined object, for example, similar to step S102 illustrated in FIG. 2 (S404).

In a case in which it is not determined in step S404 that the user is running within the fixed distance from the predetermined object, the information processing device according to the present embodiment performs counting reset for selection, for example, similar to step S104 illustrated in FIG. 2 (S406). In addition, the information processing device according to the present embodiment performs counting-up for cancellation, for example, similar to step S106 illustrated in FIG. 2 (S408).

Here, FIG. 5 illustrates an example in which the process of step S408 is performed after the process of step S406, but the information processing device according to the present embodiment may perform the process of step S406 and the process of step S408 in parallel. In addition, the information processing device according to the present embodiment can also perform the process of step S406 after the process of step S408.

The information processing device according to the present embodiment determines whether or not the user has run by a fixed distance (or for a fixed time), for example, similar to step S108 illustrated in FIG. 2 (S410).

In a case in which it is determined in step S410 that the user has run by the fixed distance (or for the fixed time), the information processing device according to the present embodiment performs the process of step S414 to be described later.

Further, in a case in which it is not determined in step S410 that the user has run by the fixed distance (or for the fixed time), the information processing device according to the present embodiment determines whether or not the user is running along another route, for example, similar to step S110 illustrated in FIG. 2 (S412).

In a case in which it is determined in step S412 that the user is running along another route or in a case in which it is determined in step S410 that the user has run by the fixed distance (or for the fixed time), the information processing device according to the present embodiment performs a process of cancelling the presentation of an option, for example, similar to step S112 illustrated in FIG. 2 (S414).

In addition, the information processing device according to the present embodiment terminates the processing illustrated in FIG. 5.

Further, in a case in which it is not determined in step S412 that the user is running along another route, the information processing device according to the present embodiment repeats the processes from step S404.

In a case in which it is determined in step S404 that the user is running within the fixed distance from the predetermined object, the information processing device according to the present embodiment determines whether or not the user is looking at the predetermined object corresponding to the option, for example, similar to step S216 illustrated in FIG. 5 (S416).

In a case in which it is not determined in step S416 that the user is looking at the predetermined object corresponding to the option, the information processing device according to the present embodiment performs the process of step S410.

Further, in a case in which it is determined in step S416 that the user is looking at the predetermined object corresponding to the option, the information processing device according to the present embodiment determines whether or not the user has run by the fixed distance (or for the fixed time), for example, similar to step S114 illustrated in FIG. 2 (S418).

In a case in which it is not determined in step S418 that the user has run by the fixed distance (or for the fixed time), the information processing device according to the present embodiment performs focus setting on a predetermined object (target to be gazed at) determined to be gazed at by the user, for example, similar to step S116 illustrated in FIG. 2 (S420).

When the process of step S420 is performed, the information processing device according to the present embodiment performs focus emphasis processing on the predetermined object (target to be gazed at) determined to be gazed at by the user, for example, similar to step S118 illustrated in FIG. 2 (S422).

The information processing device according to the present embodiment performs counting-up for selection, for example, similar to step S120 illustrated in FIG. 2 (S426). In addition, the information processing device according to the present embodiment performs counting reset for cancellation, for example, similar to step S122 illustrated in FIG. 2 (S428). In addition, the information processing device according to the present embodiment repeats the processes from step S404.

Here, FIG. 5 illustrates an example in which the process of step S428 is performed after the process of step S426, but the information processing device according to the present embodiment may perform the process of step S426 and the process of step S428 in parallel. In addition, the information processing device according to the present embodiment can also perform the process of step S426 after the process of step S428.

In a case in which it is determined in step S418 that the user has run by the fixed distance (or for the fixed time), it is determined whether or not the object (target) having been subjected to the focus setting has been performed in step S420 is an object corresponding to an option for rotation (S430).

In a case in which it is determined in step S430 that the object (target) is an object corresponding to an option for rotation, the information processing device according to the present embodiment rotates the object, for example, by performing the presentation process according to the second example of (3-2) described above (S432). In addition, the information processing device according to the present embodiment repeats the processes from step S404.

Further, in a case in which it is not determined in step S430 that the object (target) is an object corresponding to an option for rotation, the information processing device according to the present embodiment decides an option corresponding to the predetermined object (target to be gazed at) determined to be gazed at by the user in step S416 (S434). In addition, the information processing device according to the present embodiment terminates the processing illustrated in FIG. 5.

In a case in which the number of options N is greater than the number of options Thresh to be presented to the user at once and the user cannot run separately at the time of moving (there are a plurality of options that may be decided), the information processing device according to the present embodiment performs, for example, the processing illustrated in FIG. 5. Note that it is needless to say that processing in a case in which the number of options N is greater than the number of options Thresh to be presented to the user at once and the user cannot run separately at the time of moving is not limited to the example illustrated in FIG. 5.

A process according to the information processing method according to the present embodiment is, for example, the above-described first to fourth examples. Note that it is needless to say that an example of the process according to the information processing method according to the present embodiment is not limited to the above-described first to fourth examples.

Information Processing Device According to the Present Embodiment

Next, an example of a configuration of the information processing device according to the present embodiment which is capable of performing the above-described process according to the information processing method according to the present embodiment will be described.

Figure 6:
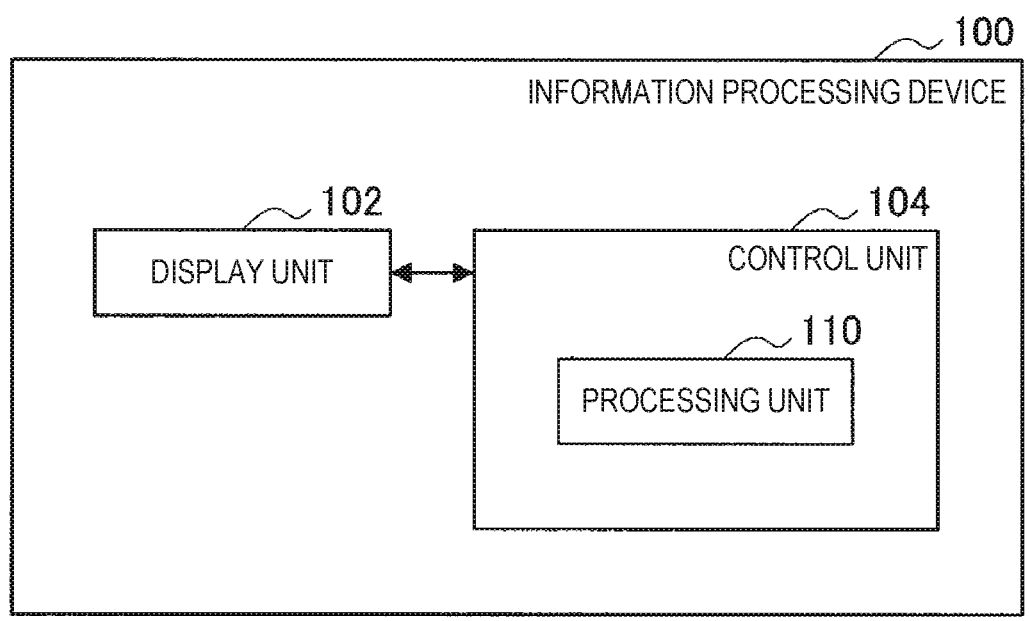
FIG. 6 is a block diagram illustrating an example of a configuration of the information processing device according to the present embodiment.

FIG. 6 is a block diagram illustrating an example of a configuration of an information processing device 100 according to the present embodiment. The information processing device 100 includes, for example, a display unit 102 and a control unit 104.

In addition, the information processing device 100 may include, for example, a read only memory (ROM, not shown), a random access memory (RAM, not shown), a storage unit (not shown), an operation unit (not shown) which is operable by a user of the information processing device 100, a communication unit (not shown) for communicating an external device, and the like. For example, the information processing device 100 connects the above-described components to each other through a bus as a data transmission line. The information processing device 100 is driven by power supplied from an internal power supply (not shown) such as a battery or power supplied from an external power supply of the information processing device 100.

The ROM (not shown) stores control data such as a program used by the control unit 104 and arithmetic operation parameters. The RAM (not shown) temporarily stores a program executed by the control unit 104, and the like.

The storage unit (not shown), which is storage means included in the information processing device 100, stores various data such as data according to the information processing method according to the present embodiment, such as "a table (or a database) in which information indicating a user and data indicating an option to be presented are associated with each other", and various applications. Here, the storage unit (not shown) is, for example, a magnetic recording medium such as a hard disk, a non-volatile memory such as a flash memory, or the like. In addition, the storage unit (not shown) may be detachable from the information processing device 100.

The operation unit (not shown) is, for example, an operation input device to be described later. In addition, the communication unit (not shown) is, for example, a communication interface to be described later.

Hardware Configuration Example of Information Processing Device 100

Figure 7:
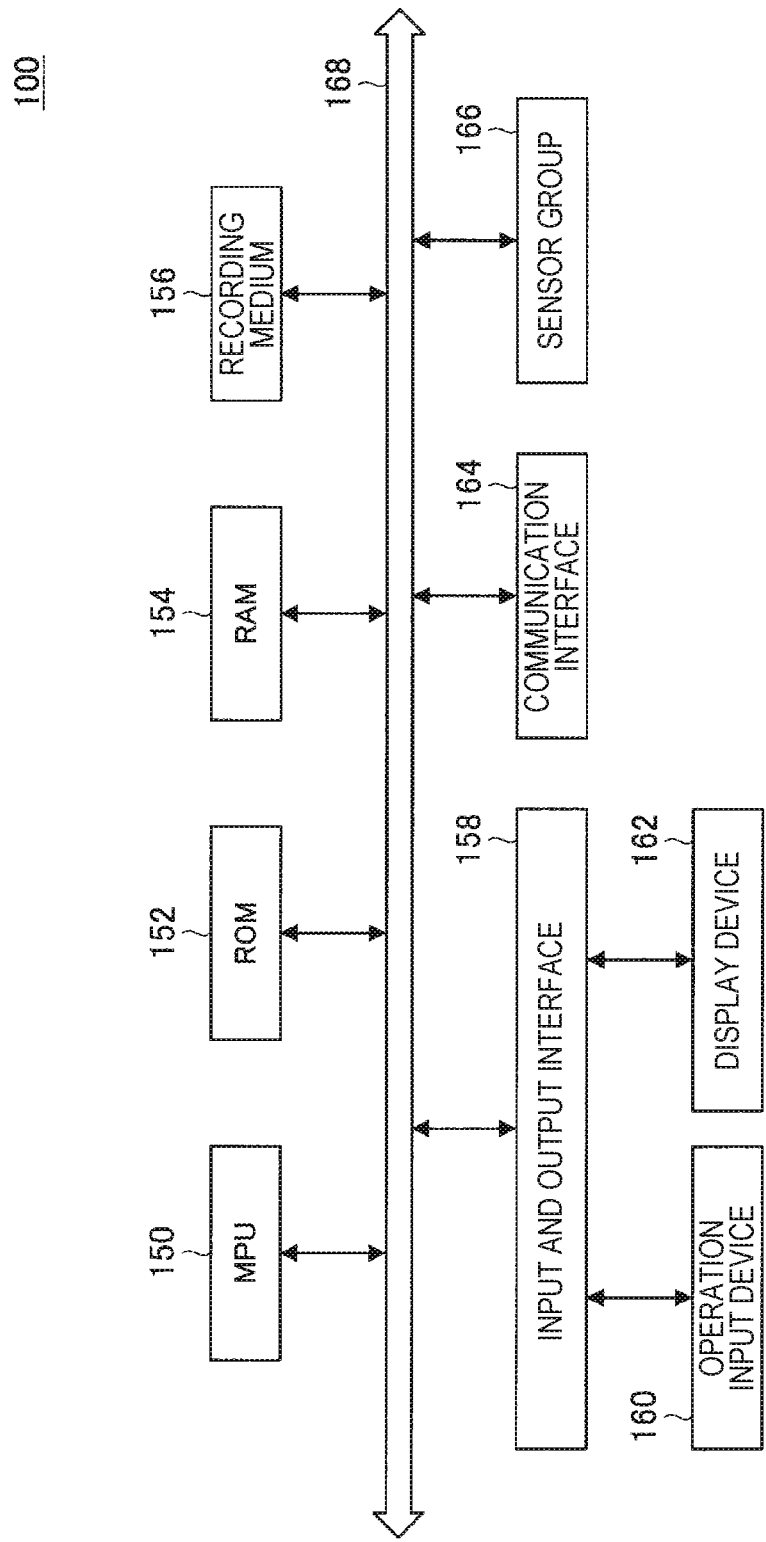
FIG. 7 is a diagram illustrating an example of a hardware configuration of the information processing device according to the present embodiment.

FIG. 7 is a diagram illustrating an example of a hardware configuration of the information processing device 100 according to the present embodiment. The information processing device 100 includes, for example, an MPU 150, a ROM 152, a RAM 154, a recording medium 156, an input and output interface 158, an operation input device 160, a display device 162, a communication interface 164, and a sensor group 166. In addition, for example, the information processing device 100 connects components to each other through a bus 168 as a data transmission line.

The MPU 150 is constituted by various processing circuits such as one or two or more processors, which are constituted by an arithmetic operation circuit such as a micro processing unit (MPU), and a counter, and functions as the control unit 104 that controls the entire information processing device 100.

In addition, the MPU 150 plays a role of, for example, a processing unit 110 to be described later in the information processing device 100.

Further, for example, in a case in which the information processing device 100 is a device, such as an HMD or a spectacle type wearable device (eyewear), which is used by being worn on a user's head, the MPU 150 may perform one or two or more processes related to the user such as a process of estimating the posture of the user's head, a process of estimating the user's visual line, and a process of recognizing a space where the user is present.

Note that the processing unit 110 may be constituted by a dedicated (or general-purpose) circuit (for example, a processor separate from the MPU 150, or the like) which is capable of realizing processing of the processing unit 110.

The ROM 152 stores control data such as a program used by the MPU 150 and arithmetic operation parameters. The RAM 154 temporarily stores, for example, a program executed by the MPU 150, and the like.

The recording medium 156 functions as a storage unit (not shown), and stores various data such as data according to the information processing method according to the present embodiment, such as "a table (or a database) in which information indicating a user and data indicating an option to be presented are associated with each other", and various applications. Here, the recording medium 156 is, for example, a magnetic recording medium such as a hard disk, or a non-volatile memory such as a flash memory. In addition, the recording medium 156 may be detachable from the information processing device 100.

The input and output interface 158 connects, for example, the operation input device 160 and the display device 162. The operation input device 160 functions as an operation unit (not shown), and the display device 162 functions as the display unit 102. Here, the input and output interface 158 is, for example, a universal serial bus (USB) terminal, a digital visual interface (DVI) terminal, a high-definition multimedia interface (HDMI) (registered trademark) terminal, various processing circuits, or the like.

In addition, the operation input device 160 is provided on, for example, the information processing device 100, and is connected to the input and output interface 158 within the information processing device 100. The operation input device 160 is, for example, buttons, direction keys, a rotary selector such as a jog dial, a combination thereof, or the like.

In addition, the display device 162 is provided on, for example, the information processing device 100, and is connected to the input and output interface 158 within the information processing device 100. The display device 162 is, for example, a liquid crystal display, an organic electroluminescence (EL) display, an organic light emitting diode display (also referred to as an OLED display), or the like. Further, for example, in a case in which the information processing device 100 is a device, such as an HMD or a spectacle type wearable device (eyewear), which is used by being worn on a user's head, the information processing device 100 may include the display device 162 for each of the right eye and the left eye of the user.

Note that it is needless to say that the input and output interface 158 can also be connected to an external device such as an external operation input device (for example, a keyboard, a mouse, or the like) of the information processing device 100 or an external display device. In addition, the display device 162 may be a device, such as a touch panel, which is capable of performing display and a user's operation.

The communication interface 164, which is communication means included in the information processing device 100, functions as a communication unit (not shown) for communicating with an external device such as a server in a wired or wireless manner through a network (or directly). Here, the communication interface 164 is, for example, a communication antenna and a radio frequency (RF) circuit (wireless communication), an IEEE802.15.1 port and a transmission and reception circuit (wireless communication), an IEEE802.11 port and a transmission and reception circuit (wireless communication), a local area network (LAN) terminal and a transmission and reception circuit (wired communication), or the like.

The sensor group 166 is one or two or more sensors included in the information processing device 100. A sensor constituting the sensor group 166 is, for example, one or two or more of "a position sensor such as a GNSS device", "a posture detection sensor such as a 9 degrees of freedom (9DOF) sensor", and "one or two or more imaging devices such as an imaging device for visual line detection, an imaging device for space recognition, an imaging device for posture detection". Note that it is needless to say that an example of the sensor constituting the sensor group 166 is not limited to the above-described example.

The information processing device 100 performs a process according to the information processing method according to the present embodiment by, for example, a configuration illustrated in FIG. 7. Note that a hardware configuration of the information processing device 100 according to the present embodiment is not limited to the configuration illustrated in FIG. 7.

For example, "in a case in which the information processing device 100 is an external device (for example, a communication device such as a smart phone, or a computer such as a server) of a device, such as an HMD, which is worn by a user" or "in a case of a configuration in which an external display device is connected to the information processing device 100", the information processing device 100 may not include the display device 162.

For example, "in a case in which the information processing device 100 is an external device (for example, a communication device such as a smart phone, or a computer such as a server) of a device, such as an HMD, which is worn by a user" or "in a case of a configuration in which an external sensor group is connected to the information processing device 100", the information processing device 100 may not include the sensor group 166.

Further, for example, in a case in which the information processing device 100 communicates with an external device or the like through an external communication device connected thereto, the information processing device 100 may not include the communication interface 164. In addition, the communication interface 164 may be configured to be capable of communicating with one or two or more external devices or the like by a plurality of communication methods.

In addition, for example, the information processing device 100 can be configured not to include either one or both of the recording medium 156 and the operation input device 160.

In addition, for example, the information processing device 100 can be configured according to an application example of the information processing device 100 to be described later.

In addition, for example, a portion or the entirety of the configuration illustrated in FIG. 7 (or a configuration according to a modification example) may be realized by one or two or more integrated circuits (IC).

An example of a configuration of the information processing device 100 will be described again with reference to FIG. 6. The display unit 102, which is display means included in the information processing device 100, displays various screens, such as a screen on which a predetermined object as illustrated in FIGS. 1A and 1B is displayed, on a display screen.

Here, the display unit 102 is, for example, a liquid crystal display, an organic EL display, or the like. Further, for example, in a case in which the information processing device 100 is a device, such as an HMD or a spectacle type wearable device (eyewear), which is used by being worn on a user's head, the display unit 102 may be provided for each of the right eye and the left eye of the user.

The control unit 104 is constituted by, for example, an MPU or the like, and plays a role of controlling the entire information processing device 100. In addition, the control unit 104 includes, for example, the processing unit 110, and plays a leading role of performing a process according to the information processing method according to the present embodiment.

Note that, hereinafter, although a case in which the processing unit 110 performs a process according to the information processing method according to the present embodiment is described as an example, the information processing device according to the present embodiment may have a configuration based on a method of separating processes according to the information processing method according to the present embodiment. As an example, the information processing device according to the present embodiment includes "a decision unit performing the process (decision process) of (1) described above, a selection unit performing the process (selection process) of (2) described above, a presentation control unit performing the process (presentation control process) of (3) described above, and an execution control unit performing the process (execution control process) of (4) described above". In addition, the information processing device according to the present embodiment may include, for example, an image processing unit processing a captured image, a state acquisition unit performing a process of acquiring states (a first state, a second state, and a third state) regarding the movement of a user, and the like.

The processing unit 110 plays a leading role of performing a process according to the information processing method according to the present embodiment. The processing unit 110 performs decision determination with respect to an option associated with a predetermined object by performing the process (decision process) of (1) described above and determining whether or not a user is following the predetermined object.

In addition, the processing unit 110 may further perform, for example, one or two or more of the process (selection process) of (2) described above, the process (presentation control process) of (3) described above, and the process (execution control process) of (4) described above.

The information processing device 100 performs a process according to the information processing method according to the present embodiment, for example, by a configuration illustrated in FIG. 6. Therefore, the information processing device 100 can realize the decision of an option based on a user's operation, for example, by the configuration illustrated in FIG. 6.

In addition, the information processing device 100 can exhibit effects obtained by performing the above-described process according to the information processing method according to the present embodiment, for example, by the configuration illustrated in FIG. 6.

Note that a configuration of the information processing device according to the present embodiment is not limited to the configuration illustrated in FIG. 6.

For example, the information processing device according to the present embodiment can be provided with the processing unit 110 illustrated in FIG. 6 separately from the control unit 104 (for example, can realize the processing unit by another processing circuit). In addition, the processing unit 110 is realized by a plurality of processing circuits, and functions may be performed so as to be distributed to the plurality of processing circuits.

In addition, as described above, a configuration for realizing a process according to the information processing method according to the present embodiment is not limited to the configuration illustrated in FIG. 6, and it is possible to adopt a configuration based on a method of separating processes according to the information processing method according to the present embodiment.

For example, "in a case in which the information processing device according to the present embodiment is an external device (for example, a communication device such as a smart phone, or a computer such as a server) of a device, such as an HMD, which is worn by a user" or "in a case of a configuration in which an external display device is connected to the information processing device according to the present embodiment", the information processing device according to the present embodiment may not include the display unit 102.

In addition, the information processing device according to the present embodiment may further include other components such as a communication unit (not shown).

Although the information processing device has been described above as the present embodiment, the present embodiment is not limited to such a configuration. The present embodiment can be applied to various apparatuses, such as "a computer such as a personal computer (PC) or a server", "an HMD", "an eyewear type wearable device", "various wearable devices, such as a timepiece type device and a wristband type device, which are used by being worn on the body of a user", "a communication device such as a smart phone", "a tablet type device", and "a game machine", "a moving object such as a bicycle, an automobile, or a two wheels self balance electric scooter", which are capable of performing a process according to the information processing method according to the present embodiment. In addition, an example in which the information processing device is applied to an automobile is application to a head-up display included in the automobile. In addition, the present embodiment can also be applied to, for example, a processing IC capable of being embedded into the above-described apparatuses.

In addition, the information processing device according to the present embodiment may be applied to a processing system on the assumption of connection (or communication between devices) to a network like, for example, cloud computing. An example of the processing system in which a process according to the information processing method according to the present embodiment is performed is "a system in which some of the processes according to the information processing method according to the present embodiment are performed by one device constituting the processing system and processes other than some of the processes according to the information processing method according to the present embodiment are performed by another device constituting the processing system", or the like.

Program According to the Present Embodiment

It is possible to realize the decision of an option based on a user's operation by executing a program for causing a computer system to function as the information processing device according to the present embodiment (for example, a program capable of executing processes according to the information processing method according to the present embodiment such as "the process (decision process) of (1) described above" or "one or two or more processes of the process (decision process) of (1) described above, the process (selection process) of (2) described above, the process (presentation control process) of (3) described above, and the process (execution control process) of (4) described above") by a processor in the computer system. Here, an example of the computer system according to the present embodiment is a single computer or a plurality of computers. A series of processes according to the information processing method according to the present embodiment are performed by the computer system according to the present embodiment.

In addition, a program for causing a computer system information processing method according to the present embodiment to function as the information processing device according to the present embodiment is executed by a processor or the like in a computer system, so that it is possible to exhibit effects obtained by the above-described process according to the information processing method according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above description, a program (computer program) causing a computer system to function as the information processing device according to the present embodiment is provided, but the present embodiment can further provide a recording medium storing the program.

The above-described configuration is an example of the present embodiment, and naturally falls within the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including a processing unit that performs decision determination with respect to an option associated with a predetermined object by determining whether a user is following the predetermined object.

(2)

The information processing device according to (1), in which the processing unit performs the decision determination in a case in which a relative positional relationship between at least a portion of the user and the predetermined object changes.

(3)

The information processing device according to (1) or (2), in which the processing unit determines that the user is following the predetermined object in a case in which a relative distance between the user and the predetermined object satisfies a first condition and the user has moved a predetermined distance.

(4)

The information processing device according to (3), in which the processing unit determines whether the relative distance satisfies the first condition by comparing the relative distance and a set first threshold value with each other.

(5)

The information processing device according to (4), in which the processing unit determines that the relative distance satisfies the first condition in a case in which the relative distance is equal to or less than the first threshold value or in a case in which the relative distance is smaller than the first threshold value.

(6)

The information processing device according to any one of (3) to (5), in which the processing unit determines whether the user has moved the predetermined distance by comparing a moving distance of the user in a state where the relative distance satisfies the first condition and a set second threshold value with each other.

(7)

The information processing device according to (6), in which the processing unit determines that the user has moved the predetermined distance in a case in which the moving distance is equal to or greater than the second threshold value or in a case in which the moving distance is greater than the second threshold value.

(8)

The information processing device according to any one of (1) to (7), in which the processing unit further determines whether the user selects the predetermined object and whether the user is following the selected predetermined object.

(9)

The information processing device according to (8), in which the processing unit determines whether the user selects the predetermined object by determining whether a relative distance between the user and the predetermined object satisfies a second condition.

(10)

The information processing device according to (8) or (9), in which the processing unit determines whether the user selects the predetermined object by determining the user's gaze on the predetermined object.

(11)

The information processing device according to any one of (8) to (10), in which the processing unit determines whether the user selects the predetermined object by performing a process corresponding to a first state related to movement of the user.

(12)

The information processing device according to any one of (8) to (11), in which the processing unit determines whether the user selects the predetermined object on the basis of a moving state of the user in a right-left direction.

(13)

The information processing device according to any one of (8) to (12), in which the processing unit further determines whether a predetermined cancellation condition is satisfied, and cancels the selection of the selected predetermined object in a case in which it is determined that the cancellation condition is satisfied.

(14)

The information processing device according to any one of (1) to (13), in which the processing unit performs a process of controlling the number of the predetermined objects to be presented to the user at once.

(15)

The information processing device according to (14), in which the processing unit changes the number of predetermined objects to be presented to the user at once on the basis of a second state related to movement of the user.

(16)

The information processing device according to (14) or (15), in which the processing unit switches the predetermined object to be presented and the predetermined object not to be presented and presents the predetermined object in a case in which the number of predetermined objects to be presented at once is smaller than the number of the options.

(17)

The information processing device according to any one of (1) to (16), in which the processing unit performs a process of changing the predetermined object to be presented to the user on the basis of a third state related to movement of the user.

(18)

The information processing device according to any one of (2) to (17), in which the predetermined object is a virtual object disposed in a virtual space, and the processing unit determines that the user is following the virtual object in a case in which a virtual positional relationship between the user in a real space and the virtual object in the virtual space has changed.

(19)

An information processing method executed by an information processing device, the information processing method including a step of performing decision determination with respect to an option associated with a predetermined object by determining whether a user is following the predetermined object.

(20)

A program causing a computer to achieve a function of performing decision determination with respect to an option associated with a predetermined object by determining whether a user is following the predetermined object.

REFERENCE SIGNS LIST 100 information processing device
102 display unit
104 control unit
110 processing unit
O1, O2 object

The invention claimed is:

1. An information processing device, comprising:
a processor configured to:
acquire a positional relationship between a user and a specific object in a virtual space;
determine, based on the positional relationship, a relative distance between the user and the specific object is one of equal to or less than a first threshold value;
determine a specific time period has elapsed after the determination that the relative distance between the user and the specific object is one of equal to or less than the first threshold value;
determine the user follows the specific object, based on the determination that the specific time period has elapsed and the determination that the relative distance between the user and the specific object is one of equal to or less than the first threshold value;
determine an option associated with the specific object based on the determination that the user follows the specific object; and
control execution of a first process corresponding to the determined option.

2. The information processing device according to claim 1, wherein the processor is further configured to determine the user follows the specific object based on a change in a relative positional relationship between a portion of the user and the specific object.

3. The information processing device according to claim 2, wherein
the specific object is a virtual object in the virtual space, and
the processor is further configured to determine the user follows the virtual object based on a change in a virtual positional relationship between the user in a real space and the virtual object in the virtual space.

4. The information processing device according to claim 1, wherein the processor is further configured to determine the user follows the specific object based on a movement of the user by a specific distance.

5. The information processing device according to claim 4, wherein the processor is further configured to determine the user has moved the specific distance based on a comparison between a second threshold value and a moving distance of the user in a state the relative distance between the user and the specific object is one of equal to or less than the first threshold value.

6. The information processing device according to claim 5, wherein the processor is further configured to determine the user has moved the specific distance in case:
the moving distance is equal to the second threshold value, or
the moving distance is greater than the second threshold value.

7. The information processing device according to claim 1, wherein the processor is further configured to determine the user selects the specific object and the user follows the selected specific object.

8. The information processing device according to claim 7, wherein the processor is further configured to determine the user selects the specific object in case the relative distance between the user and the specific object satisfies a specific condition.

9. The information processing device according to claim 7, wherein the processor is further configured to determine the user selects the specific object based on a gaze of the user on the specific object.

10. The information processing device according to claim 7, wherein the processor is further configured to determine the user selects the specific object based on a second process corresponding to a first state related to a movement of the user.

11. The information processing device according to claim 7, wherein the processor is further configured to determine the user selects the specific object based on a moving state of the user in a right-left direction.

12. The information processing device according to claim 7, wherein the processor is further configured to:
determine a cancellation condition is satisfied; and
cancel the selection of the selected specific object based on the determination that the cancellation condition is satisfied.

13. The information processing device according to claim 1, wherein the processor is further configured to control a number of objects presented concurrently to the user.

14. The information processing device according to claim 13, wherein the processor is further configured to change the number of objects presented concurrently to the user based on a second state related to a movement of the user.

15. The information processing device according to claim 13, wherein the processor is further configured to:
switch a first object of the number of objects to be presented and a second object of the number of objects not to be presented; and
present the first object in case the number of objects to be concurrently presented is smaller than a number of options.

16. The information processing device according to claim 1, wherein the processor is further configured to change the specific object presented to the user based on a third state related to a movement of the user.

17. An information processing method, comprising:
acquiring a positional relationship between a user and a specific object in a virtual space;
determining, based on the positional relationship, a relative distance between the user and the specific object is one of equal to or less than a threshold value;
determining a specific time period has elapsed after the determination that the relative distance between the user and the specific object is one of equal to or less than the threshold value;
determining the user follows the specific object, based on the determination that the specific time period has elapsed and the determination that the relative distance between the user and the specific object is one of equal to or less than the threshold value;
determining an option associated with the specific object based on the determination that the user follows the specific object; and
controlling execution of a process corresponding to the determined option.

18. A non-transitory computer-readable medium having stored thereon computer-executable instructions which, when executed by a computer, cause the computer to execute operations, the operations comprising:
acquiring a positional relationship between a user and a specific object in a virtual space;
determining, based on the positional relationship, a relative distance between the user and the specific object is one of equal to or less than a threshold value;
determining a specific time period has elapsed after the determination that the relative distance between the user and the specific object is one of equal to or less than the threshold value;
determining the user follows the specific object, based on the determination that the specific time period has elapsed and the determination that the relative distance between the user and the specific object is one of equal to or less than the threshold value;
determining an option associated with the specific object based on the determination that the user follows the specific object; and
controlling execution of a process corresponding to the determined option.

* * * * *